(12) United States Patent
Leddy, III

(10) Patent No.: US 12,132,728 B2
(45) Date of Patent: Oct. 29, 2024

(54) TRUSTED IDENTIFICATION OF ENROLLING USERS BASED ON IMAGES AND UNIQUE IDENTIFIERS ASSOCIATED WITH SPONSORING USERS

(71) Applicant: Visa International Service Association, San Francisco, CA (US)

(72) Inventor: William Joseph Leddy, III, Lakeway, TX (US)

(73) Assignee: Visa International Service Association, San Francisco, CA (US)

( * ) Notice: Subject to any disclaimer, the term of this patent is extended or adjusted under 35 U.S.C. 154(b) by 226 days.

(21) Appl. No.: 17/911,436

(22) PCT Filed: May 14, 2021

(86) PCT No.: PCT/US2021/032400
§ 371 (c)(1),
(2) Date: Sep. 14, 2022

(87) PCT Pub. No.: WO2021/262338
PCT Pub. Date: Dec. 30, 2021

(65) Prior Publication Data
US 2023/0353562 A1    Nov. 2, 2023

Related U.S. Application Data

(60) Provisional application No. 63/043,376, filed on Jun. 24, 2020.

(51) Int. Cl.
*H04L 9/40* (2022.01)

(52) U.S. Cl.
CPC ...... *H04L 63/0861* (2013.01); *H04L 63/0853* (2013.01); *H04L 63/0869* (2013.01); *H04L 2463/082* (2013.01)

(58) Field of Classification Search
CPC ............. H04L 63/0861; H04L 63/0853; H04L 63/0869; H04L 2463/082; H04W 12/77; H04W 12/06
See application file for complete search history.

(56) References Cited

U.S. PATENT DOCUMENTS 9,596,237 B2    3/2017    Law et al.
9,892,409 B2    2/2018    Ross et al.
(Continued)

FOREIGN PATENT DOCUMENTS

EP        3579524 A1    12/2019
WO    2018174824 A1     9/2018

*Primary Examiner* — Michael Won
(74) *Attorney, Agent, or Firm* — The Webb Law Firm

(57) ABSTRACT

Provided is a method for providing trusted identification of an enrolling user. The method may include communicating a unique identifier to a sponsor device of a sponsoring user. Image data associated with an image of an enrolling user may be received from the sponsor device, and the image data may include the unique identifier. The first image data may be recorded in a ledger. An edge may be generated in a tree based on the first image data and the first unique identifier, and the edge may connect a first node associated with the sponsoring user to a second node associated with the enrolling user. A trust score for the second node may be determined based on a respective trust score of each node (including the first node) connected to the second node by a respective edge. A system and computer program product are also disclosed.

20 Claims, 18 Drawing Sheets

(56) References Cited

U.S. PATENT DOCUMENTS

| | | | |
|---|---|---|---|
| 9,892,460 B1 | 2/2018 | Winklevoss et al. | |
| 10,019,466 B2 * | 7/2018 | Huang | G06F 16/9024 |
| 10,594,689 B1 | 3/2020 | Weaver et al. | |
| 10,873,646 B1 * | 12/2020 | Priego Porcuna | G06F 9/485 |
| 11,063,770 B1 * | 7/2021 | Peng | G06F 21/64 |
| 2004/0153649 A1 | 8/2004 | Rhoads et al. | |
| 2016/0275461 A1 | 9/2016 | Sprague et al. | |
| 2017/0232300 A1 * | 8/2017 | Tran | G06F 1/163 |
| | | | 434/247 |
| 2018/0109507 A1 | 4/2018 | Caldera et al. | |
| 2019/0141021 A1 * | 5/2019 | Isaacson | G06Q 30/0635 |
| 2019/0370813 A1 | 12/2019 | Bravick et al. | |
| 2021/0073290 A1 * | 3/2021 | Hunter | G06N 3/084 |
| 2022/0029831 A1 * | 1/2022 | Baek | G16Y 10/75 |
| 2022/0198034 A1 * | 6/2022 | Rodriguez | H04L 9/30 |
| 2022/0200973 A1 * | 6/2022 | Tola | H04L 9/3013 |
| 2022/0374895 A1 * | 11/2022 | Pratz | G06Q 20/308 |
| 2023/0198765 A1 * | 6/2023 | Holmes-Mitra | H04L 9/0863 |
| | | | 713/189 |
| 2023/0344705 A1 * | 10/2023 | Amini | H04L 43/08 |

* cited by examiner

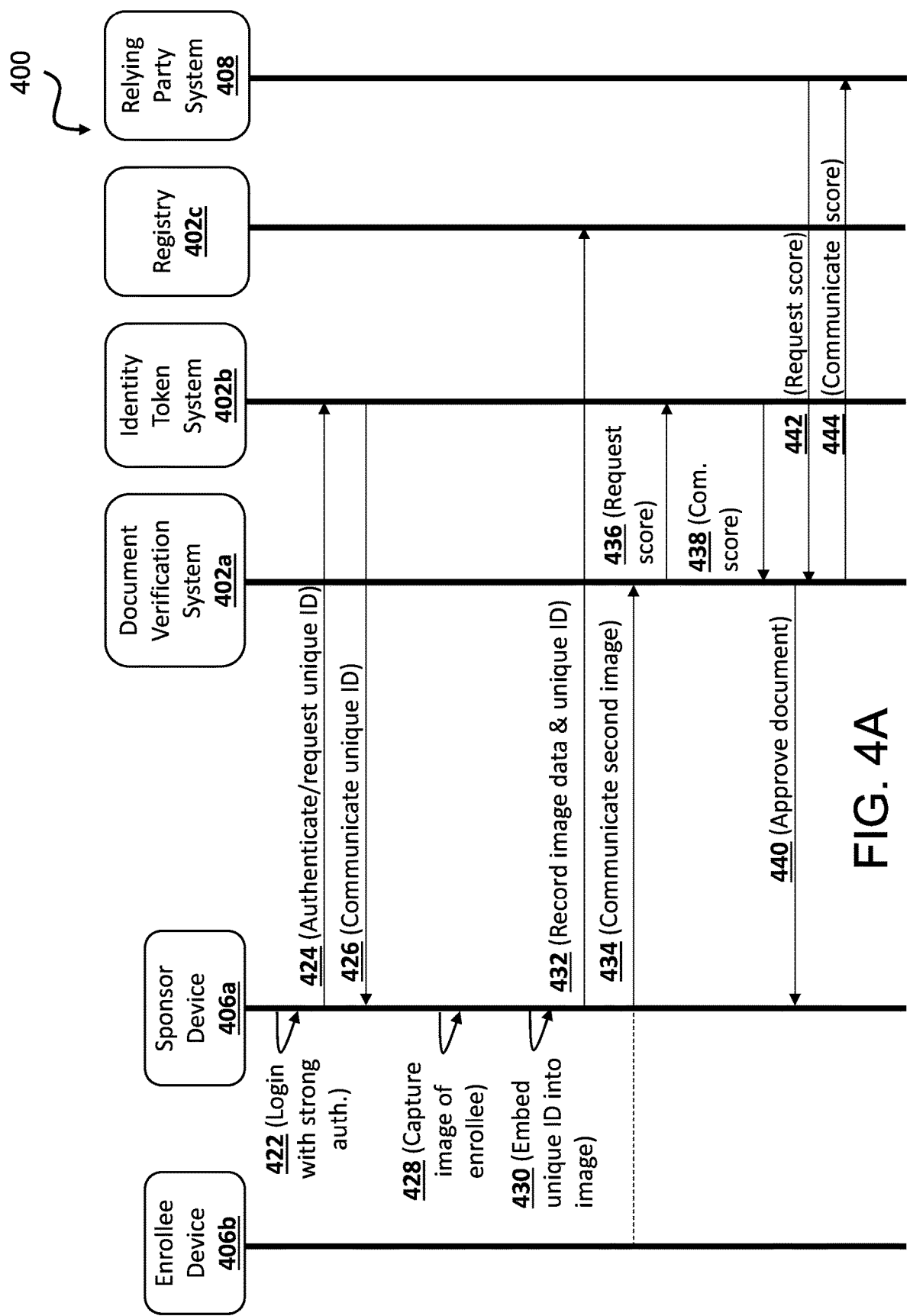

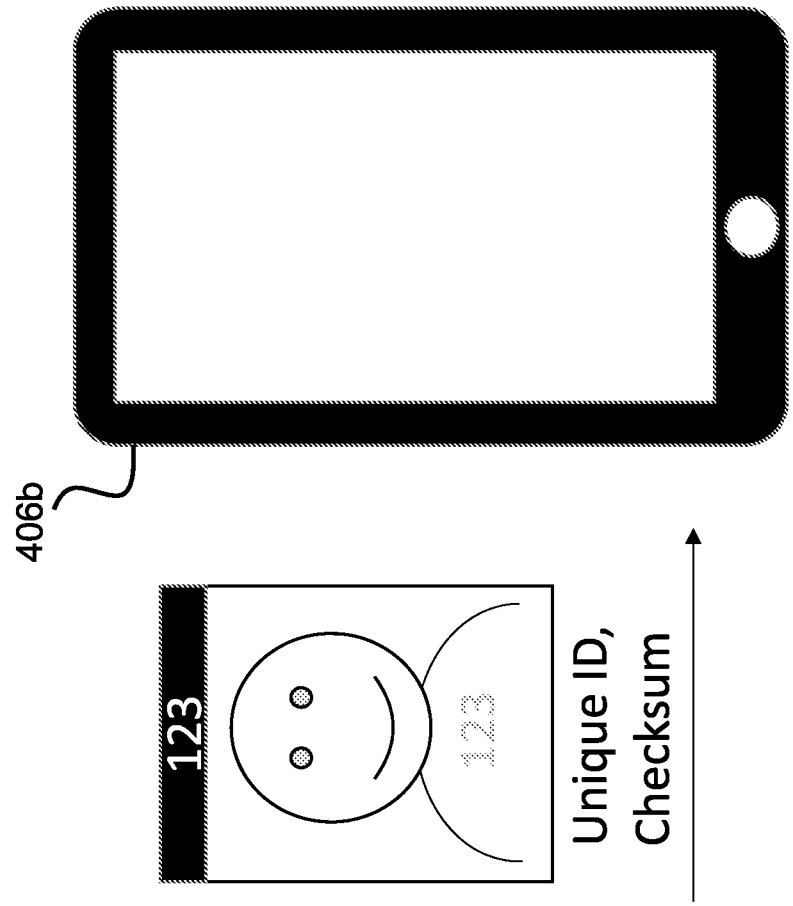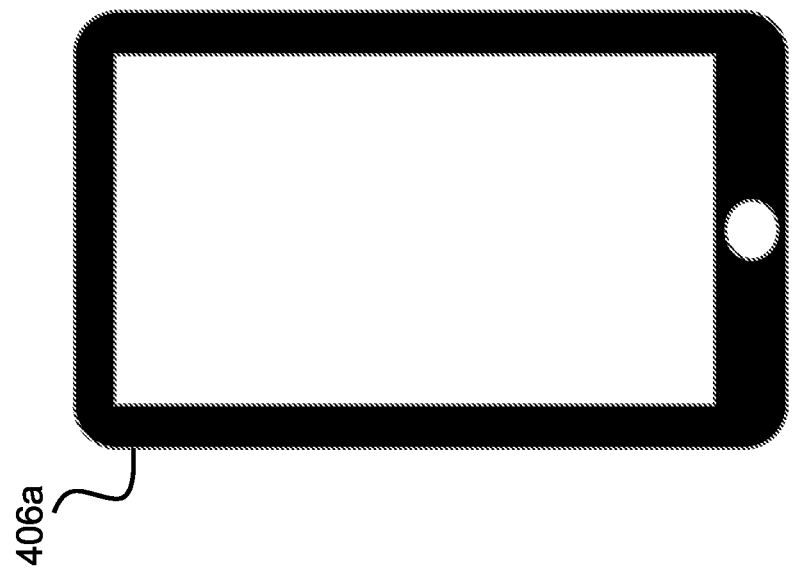
FIG. 4F

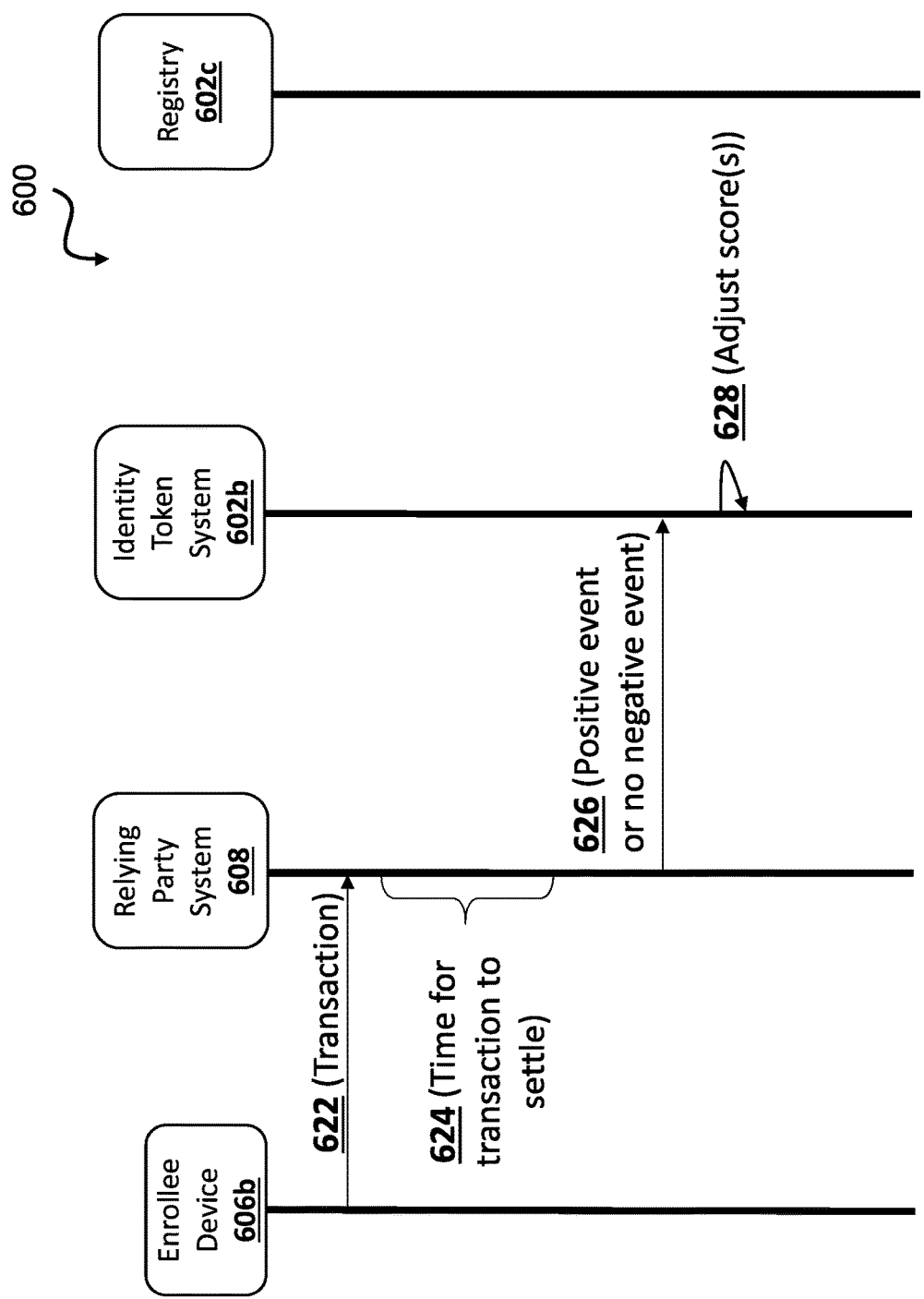

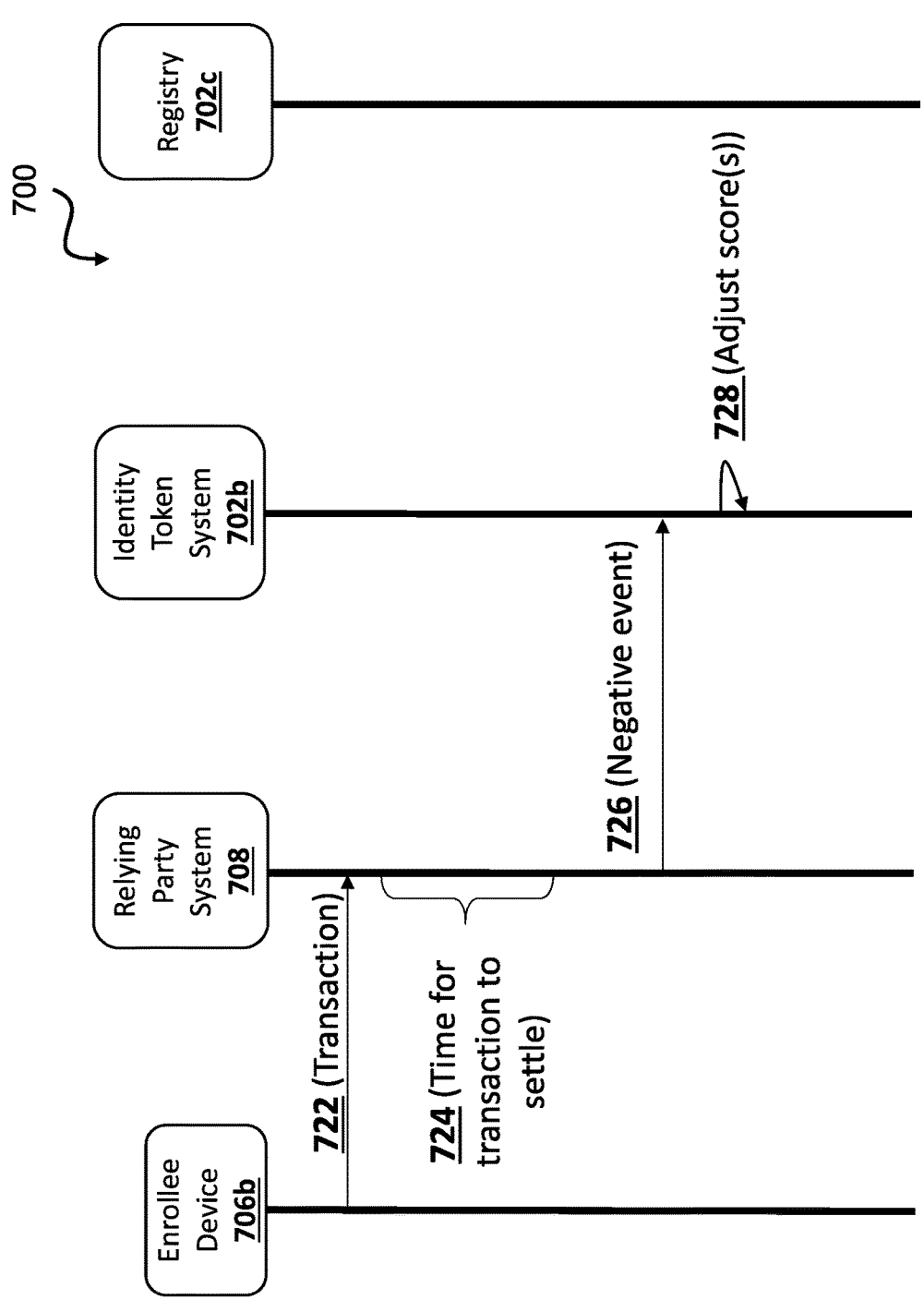

TRUSTED IDENTIFICATION OF ENROLLING USERS BASED ON IMAGES AND UNIQUE IDENTIFIERS ASSOCIATED WITH SPONSORING USERS

CROSS REFERENCE TO RELATED APPLICATION

This application is the United States national phase of International Application No. PCT/US2021/032400 filed May 14, 2021, and claims the benefit of U.S. Provisional Patent Application No. 63/043,376, filed on Jun. 24, 2020, the disclosures of which are hereby incorporated by reference in their entirety.

BACKGROUND

1. Field

This disclosed subject matter relates generally to methods, systems, and products for providing trusted identification and, in some particular embodiments or aspects, to a method, system, and computer program product for providing trusted identification of enrolling users based on images and unique identifiers associated with sponsoring users.

2. Technical Considerations

Certain systems and/or services request that users thereof provide evidence (e.g., documentation, data, and/or the like) of their identities. For example, such systems and/or services may rely on this evidence to prevent fraud (e.g., identity theft and/or the like).

However, it can be relatively easy for some users (e.g., fraudsters, malicious users, attackers, and/or the like) to obtain and/or create evidence of identities of others (e.g., stolen identities, fake identities, and/or the like). For example, due to data breaches, phishing, scams, account takeovers, phone forwarding, phone slamming, and/or the like, it may be possible for such users to obtain (e.g., steal, acquire, and/or the like) evidence of identities of others (e.g., stolen identities and/or the like). Additionally or alternatively, it may be relative easy for such users to create high quality fake evidence. For example, certain tools (e.g., websites, applications, and/or the like) may be used to create high quality representations (e.g., images and/or the like) of fake government identification (e.g., driver's license, passport, and/or the like), e.g., by merely uploading an image (e.g., an image of the purported user). Additionally or alternatively, certain tools (e.g., websites, applications, and/or the like) may be used to create high quality representations of biometric information, e.g., fake voice information (e.g., audio files and/or the like) and/or the like. For example, deepfake tools may be used to create such fake government identification, images of fake users, audio files of fake voices, other fake biometric information, and/or the like.

SUMMARY

Accordingly, it is an object of the presently disclosed subject matter to provide methods, systems, and computer program products for providing trusted identification that overcome some or all of the deficiencies identified above.

According to non-limiting embodiments or aspects, provided is a computer-implemented method for providing trusted identification. In some non-limiting embodiments or aspects, a computer-implemented method for providing trusted identification may include communicating a first unique identifier to a sponsor device associated with a sponsoring user. First image data associated with a first image of an enrolling user may be received from the sponsor device. The first image data may include the first unique identifier. The first image data and the first unique identifier may be recorded in a ledger. A first edge may be generated in a tree based on the first image data comprising the first unique identifier. The tree may include a plurality of nodes and a plurality of edges. Each node of the plurality of nodes may be connected to at least one other node of the plurality of nodes by a respective edge of the plurality of edges. The first edge may connect a first node of the plurality of nodes associated with the sponsoring user to a second node of the plurality of nodes associated with the enrolling user. A second trust score for the second node may be determined based on a respective trust score of each of at least one node of the plurality of nodes connected to the second node by a respective edge of the plurality of edges. The at least one node of the plurality of nodes may include the first node. The first node may be associated with a first trust score.

In some non-limiting embodiments or aspects, the sponsor device may include a secure mobile application. Additionally or alternatively, communicating may include communicating the first unique identifier to the secure mobile application of the sponsor device. Additionally or alternatively, receiving may include receiving the first image data from the secure mobile application of the sponsor device.

In some non-limiting embodiments or aspects, the sponsor device may log into the secure mobile application via a strong authentication technique. For example, the strong authentication technique may include at least one of two-factor authentication (2FA), Fast IDentity Online (FIDO), any combination thereof, and/or the like.

In some non-limiting embodiments or aspects, a request for the first unique identifier may be received from the sponsor device before communicating the first unique identifier.

In some non-limiting embodiments or aspects, the first image data may include a checksum value associated with the first image. Additionally or alternatively, the first image data may include the first unique identifier embedded in the first image. In some non-limiting embodiments or aspects, the first unique identifier may be embedded in the first image by inserting the first unique identifier in metadata of the first image. In some non-limiting embodiments or aspects, the first unique identifier may embed in the first image by steganography. For example, embedding the first unique identifier in the first image by steganography may include adjusting at least one bit of a plurality of pixel values of the first image based on the first unique identifier.

In some non-limiting embodiments or aspects, second image data associated with a second image of a government identification document of the enrolling user may be received. In some non-limiting embodiments or aspects, the first image may include a first representation of a face of the enrolling user and the second image may include a second representation of the face of the enrolling user. Additionally or alternatively, the first image may be compared to the second image, e.g., to determine that the first representation matches the second representation.

In some non-limiting embodiments or aspects, a request for the second trust score associated with the enrolling user may be received from a relying party system. In some non-limiting embodiments or aspects, the request may include the first unique identifier. In some non-limiting embodiments or aspects, the relying party system may create an account for the enrolling user with the relying party system based on the second trust score.

In some non-limiting embodiments or aspects, the ledger may include an encrypted distributed ledger.

In some non-limiting embodiments or aspects, at least one subset of the plurality of nodes of the tree may be identified based on network analysis.

In some non-limiting embodiments or aspects, event data (e.g., negative event data, positive event data, and/or the like) may be received. For example, negative event data associated with at least one negative event associated with a third node of the tree may be received. Additionally or alternatively, a third trust score associated with the third node may be adjusted based on the negative event data. In some non-limiting embodiments or aspects, the negative event data may include at least one of complaint data associated with a complaint, an indication associated with a fraudulent transaction, any combination thereof, and/or the like. In some non-limiting embodiments or aspects, the trust score for each node of the plurality of nodes connected to the third node by one of the plurality of edges may be adjusted.

In some non-limiting embodiments or aspects, at least one edge of the plurality of edges may be removed.

According to non-limiting embodiments or aspects, provided is a system for providing trusted identification. In some non-limiting embodiments or aspects, the system for providing trusted identification may include at least one processor and at least one non-transitory computer-readable medium including instructions to direct the at least one processor to perform any of the methods described herein.

According to non-limiting embodiments or aspects, provided is a computer program product for providing trusted identification. The computer program product may include at least one non-transitory computer-readable medium including one or more instructions that, when executed by at least one processor, cause the at least one processor to perform any of the methods described herein.

Further non-limiting embodiments or aspects are set forth in the following numbered clauses:

Clause 1: A computer-implemented method, comprising: communicating, with at least one processor, a first unique identifier to a sponsor device associated with a sponsoring user; receiving, with at least one processor, first image data associated with a first image of an enrolling user from the sponsor device, the first image data comprising the first unique identifier; recording, with at least one processor, the first image data and the first unique identifier in a ledger; generating, with at least one processor, a first edge in a tree based on the first image data comprising the first unique identifier, the tree comprising a plurality of nodes and a plurality of edges, each node of the plurality of nodes connected to at least one other node of the plurality of nodes by a respective edge of the plurality of edges, the first edge connecting a first node of the plurality of nodes associated with the sponsoring user to a second node of the plurality of nodes associated with the enrolling user; and determining, with at least one processor, a second trust score for the second node based on a respective trust score of each of at least one node of the plurality of nodes connected to the second node by a respective edge of the plurality of edges, the at least one node of the plurality of nodes comprising the first node, the first node associated with a first trust score.

Clause 2: The method of clause 1, wherein the sponsor device comprises a secure mobile application, wherein communicating comprises communicating the first unique identifier to the secure mobile application of the sponsor device, and wherein receiving comprises receiving the first image data from the secure mobile application of the sponsor device.

Clause 3: The method of clauses 1 or 2, wherein the sponsor device logs into the secure mobile application via a strong authentication technique.

Clause 4: The method of any of clauses 1-3, wherein the strong authentication technique comprises at least one of two-factor authentication (2FA), Fast IDentity Online (FIDO), or any combination thereof.

Clause 5: The method of any of clauses 1-4, further comprising: receiving, with at least one processor, a request for the first unique identifier from the sponsor device before communicating the first unique identifier.

Clause 6: The method of any of clauses 1-5, wherein the first image data comprises a checksum value associated with the first image.

Clause 7: The method of any of clauses 1-6, wherein the first image data comprises the first unique identifier embedded in the first image.

Clause 8: The method of any of clauses 1-7, further comprising: embedding, by the sponsor device, the first unique identifier in the first image by inserting the first unique identifier in metadata of the first image.

Clause 9: The method of any of clauses 1-8, further comprising: embedding, by the sponsor device, the first unique identifier in the first image by steganography.

Clause 10: The method of any of clauses 1-9, wherein embedding the first unique identifier in the first image by steganography comprises adjusting at least one bit of a plurality of pixel values of the first image based on the first unique identifier.

Clause 11: The method of any of clauses 1-10, further comprising: receiving, with at least one processor, second image data associated with a second image of a government identification document of the enrolling user.

Clause 12: The method of any of clauses 1-11, wherein the first image comprises a first representation of a face of the enrolling user and the second image comprises a second representation of the face of the enrolling user, the method further comprising: comparing, with at least one processor, the first image to the second image to determine the first representation matches the second representation.

Clause 13: The method of any of clauses 1-12, further comprising: receiving, with at least one processor, a request for the second trust score associated with the enrolling user from a relying party system.

Clause 14: The method of any of clauses 1-13, wherein the request comprises the first unique identifier.

Clause 15: The method of any of clauses 1-14, wherein the relying party system creates an account for the enrolling user with the relying party system based on the second trust score.

Clause 16: The method of any of clauses 1-15, wherein the ledger comprises an encrypted distributed ledger.

Clause 17: The method of any of clauses 1-16, further comprising: identifying, with at least one processor, at least one subset of the plurality of nodes of the tree based on network analysis.

Clause 18: The method of any of clauses 1-17, further comprising: receiving, with at least one processor, negative event data associated with at least one negative event associated with a third node of the tree; and adjusting, with at least one processor, a third trust score associated with the third node based on the negative event data.

Clause 19: The method of any of clauses 1-18, wherein the negative event data comprises at least one of complaint data associated with a complaint, an indication associated with a fraudulent transaction, or any combination thereof.

Clause 20: The method of any of clauses 1-19, further comprising: adjusting, with at least one processor, the trust score for each node of the plurality of nodes connected to the third node by one of the plurality of edges.

Clause 21: The method of any of clauses 1-20, further comprising: removing, with at least one processor, at least one edge of the plurality of edges.

Clause 22: A system, comprising: at least one processor; and at least one non-transitory computer-readable medium comprising instructions to direct the at least one processor to perform the method of any of clauses 1-21.

Clause 23: A computer program product, the computer program product comprising at least one non-transitory computer-readable medium including one or more instructions that, when executed by at least one processor, cause the at least one processor to perform the method of any of clauses 1-21.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIGS. 4A-4H are diagrams of non-limiting embodiments or aspects of an implementation of non-limiting embodiments or aspects of the process shown in FIG. 3 according to the principles of the presently disclosed subject matter;

FIG. 6 is a diagram of non-limiting embodiments or aspects of an implementation of non-limiting embodiments or aspects of the process shown in FIG. 3 according to the principles of the presently disclosed subject matter;

FIG. 7 is a diagram of non-limiting embodiments or aspects of an implementation of non-limiting embodiments or aspects of the process shown in FIG. 3 according to the principles of the presently disclosed subject matter.

DETAILED DESCRIPTION

Figure 1:
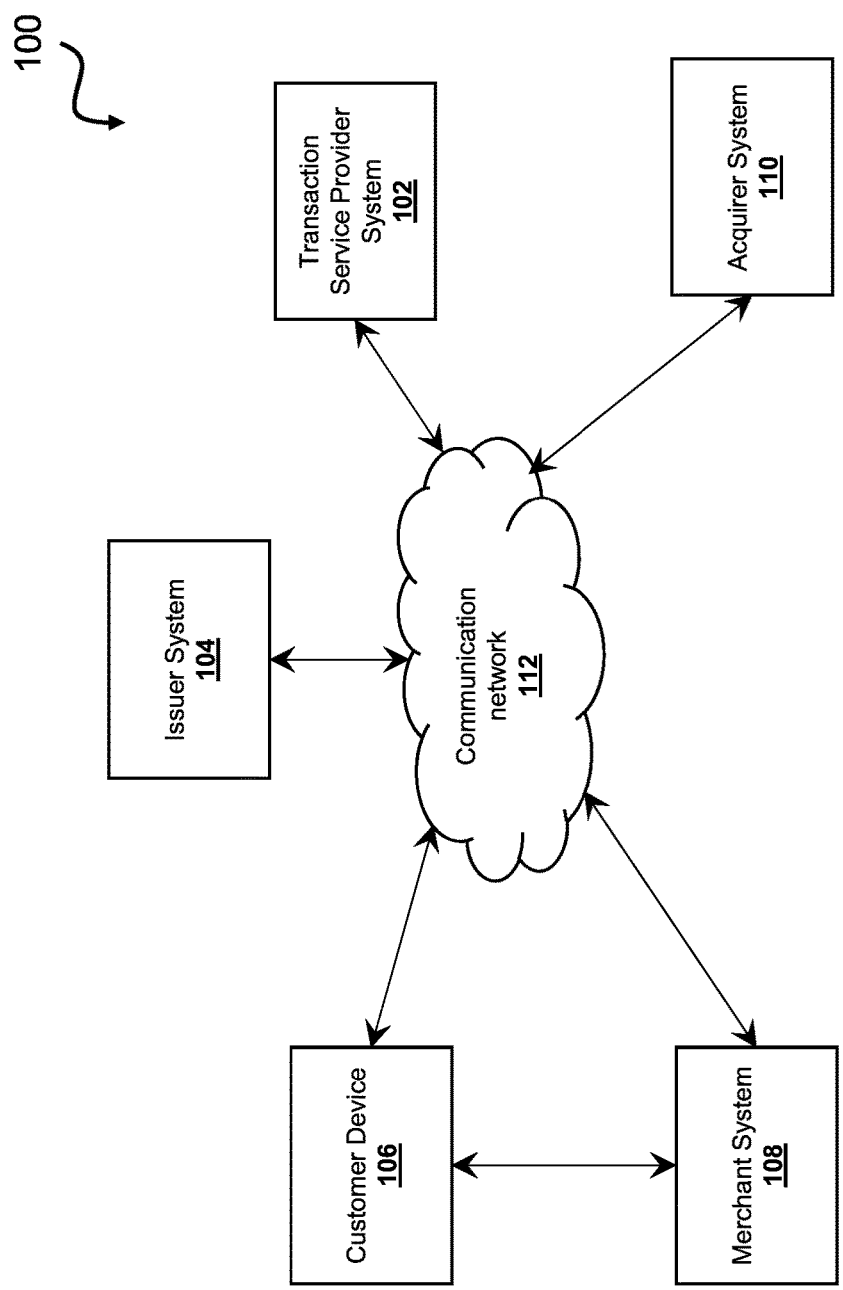
FIG. 1 is a diagram of a non-limiting embodiment of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "payment token" may refer to an identifier that is used as a substitute or replacement identifier for an account identifier, such as a PAN. Payment tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of payment tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a payment token value may be generated such that the recovery of the original PAN or other account identifier from the payment token value may not be computationally derived (e.g., with a one-way hash or other cryptographic function). Further, in some non-limiting embodiments or aspects, the payment token format may be configured to allow the entity receiving the payment token to identify it as a payment token and recognize the entity that issued the payment token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with payment tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request payment tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of payment tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term "token service provider" may refer to an entity including one or more server computers in a token service system that generates, processes and maintains payment tokens. For example, the token service provider may include or be in communication with a token vault where the generated payment tokens are stored. Additionally or alternatively, the token vault may maintain one-to-one mapping between a payment token and a PAN represented by the token. In some non-limiting embodiments or aspects, the token service provider may have the ability to set aside licensed BINs as token BINs to issue payment tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to payment token-based transactions to reporting tools and applications and present the payment token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established payment token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for providing trusted identification, including, but not limited to, providing trusted identification of enrolling users based on images and unique identifiers associated with sponsoring users. For example, non-limiting embodiments or aspects of the disclosed subject matter provide using first image data associated with a first image of an enrolling user and a first unique identifier from a sponsoring user to generate a ledger and a corresponding tree (e.g., based on the sponsorship connection between the enrolling user and the sponsoring user), which can be used to determine a trust score for each user in the tree. Such non-limiting embodiments or aspects provide techniques and systems that provide a trust score that indicates the trustworthiness of an enrolling user based on connections to other users in the tree. Additionally or alternatively, such non-limiting embodiments or aspects provide techniques and systems that allow for prevention of some users (e.g., fraudsters, malicious users, attackers, and/or the like) from using improper evidence (e.g., stolen identities, fake identities, fake government identification, and/or the like) to gain access to certain resources (e.g., new accounts, existing accounts, information, and/or the like). For example, even if a fraudster were to generate high quality fake government identification, the disclosed techniques and systems may prevent the fraudster from using the fake government identification to gain access to resources (e.g., new accounts, existing accounts, information, and/or the like) since the fraudster may not be sponsored by trustworthy sponsoring users and, therefore, may have a low or non-existent trust score.

For the purpose of illustration, in the following description, while the presently disclosed subject matter is described with respect to methods, systems, and computer program products for providing trusted identification, e.g., of enrolling users based on images and unique identifiers associated with sponsoring users, one skilled in the art will recognize that the disclosed subject matter is not limited to the illustrative embodiments or aspects. For example, the methods, systems, and computer program products described herein may be used with a wide variety of settings, such as providing trusted identification in any setting suitable for using such trusted identification. For the purpose of illustration, in the following description, while the presently disclosed subject matter is described with respect to methods, systems, and computer program products for providing trusted identification, e.g., based on images/image data, one skilled in the art will recognize that the disclosed subject matter is not limited to the illustrative embodiments or aspects. For example, the methods, systems, and computer program products described herein may be used with a wide variety of settings, such as providing trusted identification based on any type of biometric information (e.g., voice information (e.g., audio files and/or the like), fingerprint information, and/or the like).

Referring now to FIG. 1, FIG. 1 is a diagram of a non-limiting embodiment of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution, as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., a near-field communication (NFC) communication connection, a radio frequency identification (RFID) communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 106, a POS device of merchant system 108, and/or the like) may initiate the transaction, e.g., by generating an authorization request. Additionally or alternatively, the client device (e.g., customer device 106, at least one device of merchant system 108, and/or the like) may communicate the authorization request. For example, customer device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments or aspects, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments or aspects, issuer system 104 may determine an authorization decision (e.g., authorize, decline, and/or the like) based on the authorization request. For example, the authorization request may cause issuer system 104 to determine the authorization decision based thereof. In some non-limiting embodiments or aspects, issuer system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or customer device 106. Additionally or alternatively, acquirer system 110 may communicate the authorization response to merchant system 108 and/or a payment gateway. Additionally or alternatively, a payment gateway may communicate the authorization response to merchant system 108 and/or customer device 106. Additionally or alternatively, merchant system 108 may communicate the authorization response to customer device 106. In some non-limiting embodiments or aspects, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof, and/or the like).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
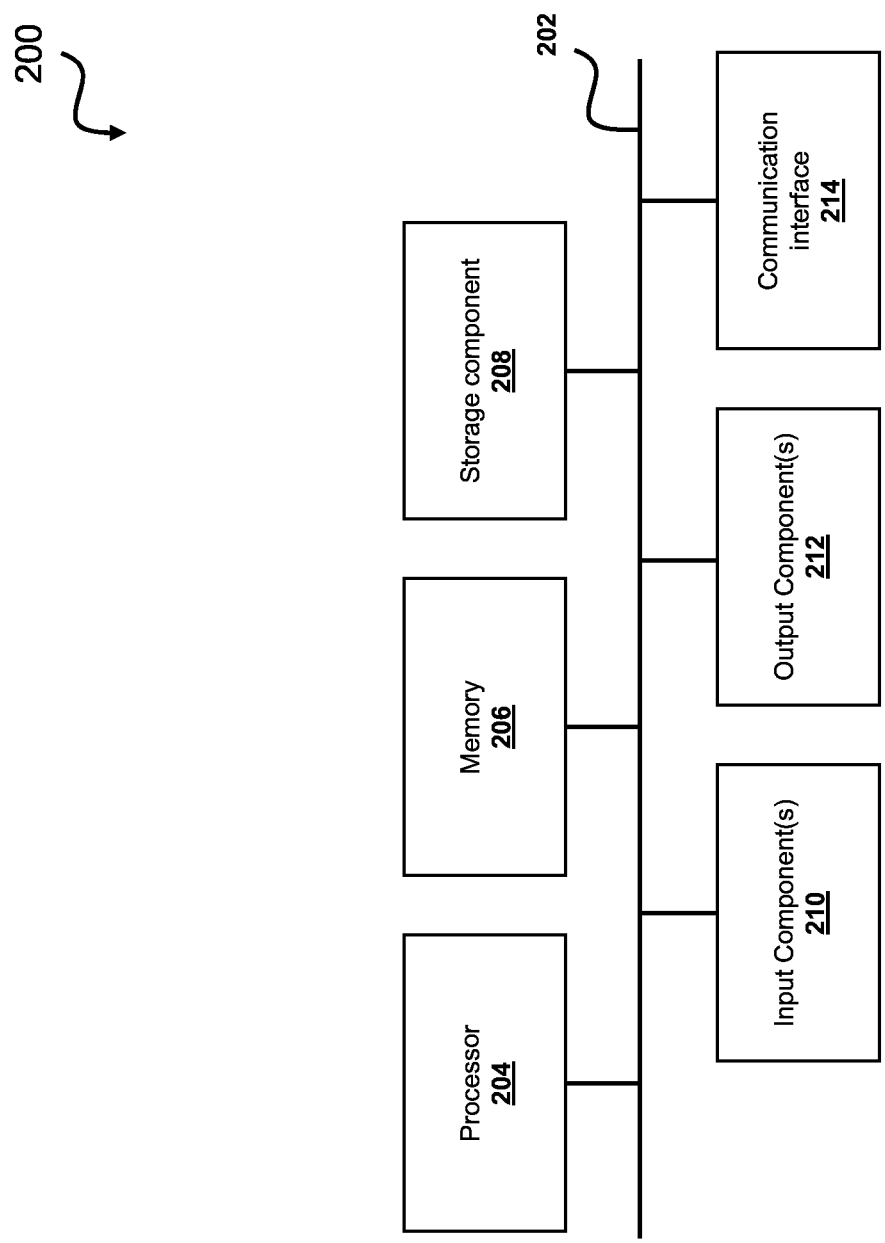
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
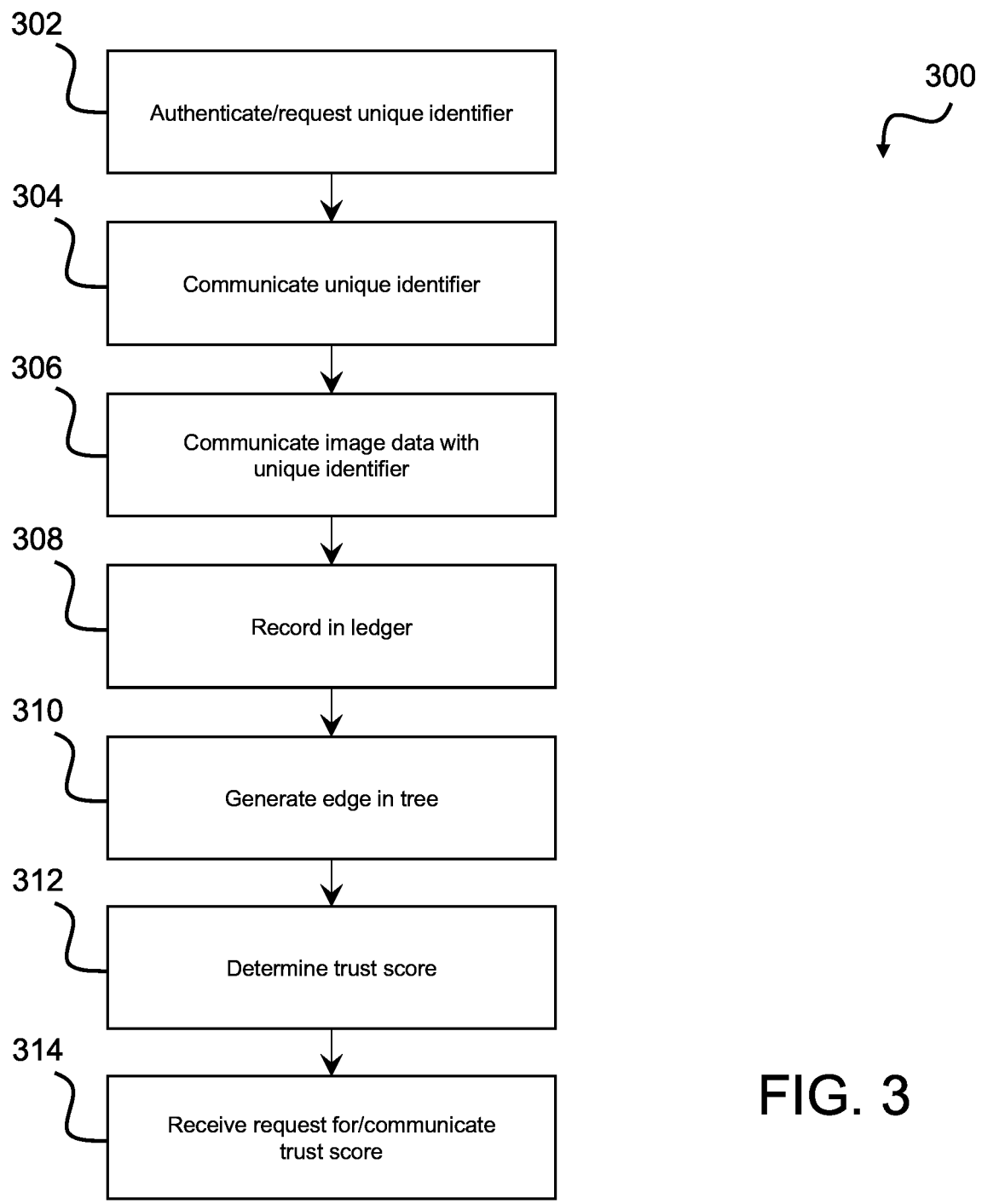
FIG. 3 is a flowchart of non-limiting embodiments or aspects of a process for providing trusted identification according to the principles of the presently disclosed subject matter.

Referring now to FIG. 3, FIG. 3 is a flowchart of non-limiting embodiments or aspects of a process 300 for providing trusted identification. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments or aspects, a sponsor device may be the same as or similar to a first customer device 106. In some non-limiting embodiments or aspects, an enrollee device may be the same as or similar to a second customer device 106. In some non-limiting embodiments or aspects, a document verification system may be implemented (e.g., completely, partially, and/or the like) by transaction service provider system 102. Additionally or alternatively, the document verification system may be implemented (e.g., completely, partially, and/or the like) by another system, another device, another group of systems, or another group of devices, separate from or including transaction service provider system 102, such as issuer system 104 (e.g., one or more devices of issuer system 104), a third party document verification system, and/or the like. In some non-limiting embodiments or aspects, an identity token system may be implemented (e.g., completely, partially, and/or the like) by transaction service provider system 102. Additionally or alternatively, the identity token system may be implemented (e.g., completely, partially, and/or the like) by another system, another device, another group of systems, or another group of devices, separate from or including transaction service provider system 102, such as issuer system 104 (e.g., one or more devices of issuer system 104), a third party identity token system, and/or the like. In some non-limiting embodiments or aspects, a registry may be implemented (e.g., completely, partially, and/or the like) by transaction service provider system 102. Additionally or alternatively, the registry may be implemented (e.g., completely, partially, and/or the like) by another system, another device, another group of systems, or another group of devices, separate from or including transaction service provider system 102, such as issuer system 104 (e.g., one or more devices of issuer system 104), a third party registry, an encrypted distributed ledger (e.g., a blockchain and/or the like), and/or the like. In some non-limiting embodiments or aspects, a relying party system may be implemented (e.g., completely, partially, and/or the like) by merchant system 108. Additionally or alternatively, the relying party system may be implemented (e.g., completely, partially, and/or the like) by another system, another device, another group of systems, or another group of devices, separate from or including merchant system 108, such as issuer system 104 (e.g., one or more devices of issuer system 104), a third customer device 106, transaction service provider system 102, acquirer system 110, a third party system, a government system, and/or the like. In some non-limiting embodiments or aspects, the document verification system, the identity token system, the registry, and/or any combination thereof may be implemented as a single system. Additionally or alternatively, at least one of (e.g., each of) the document verification system, the identity token system, and/or the registry may be implemented as a separate system (e.g., separate from the others). For the purpose of illustration, in the following description, while reference is made to images/image data, one skilled in the art will recognize that the disclosed subject matter is not limited to the illustrative embodiments or aspects, and any other type of biometric information/biometric data (e.g., voice data (e.g., audio files and/or the like), fingerprint data, and/or the like) may be used in addition to or instead of the images/image data.

As shown in FIG. 3, at step 302, process 300 may include authenticating and/or requesting a unique identifier. For example, the sponsor device (e.g., first customer device 106 and/or the like) associated with a sponsoring user may authenticate with (e.g., log into and/or the like), e.g., the identity token system (e.g., transaction service provider system 102 and/or the like), a secure mobile application associated therewith, and/or the like. Additionally or alternatively, the sponsor device may request a unique identifier (e.g., first unique identifier), e.g., from the identity token system.

In some non-limiting embodiments or aspects, the sponsor device (e.g., first customer device 106 and/or the like) may include a secure mobile application. Additionally or alternatively, the sponsor device may log into the secure mobile application via a strong authentication technique. For example, the strong authentication technique may include at least one of two-factor authentication (2FA), Fast IDentity Online (FIDO), any combination thereof, and/or the like.

In some non-limiting embodiments or aspects, the sponsor device (e.g., first customer device 106 and/or the like) may authenticate with the identity token system (e.g., transaction service provider system 102 and/or the like) via the secure mobile application (e.g., after logging into the secure mobile application via the strong authentication technique). Additionally or alternatively, the sponsor device may request the unique identifier (e.g., first unique identifier) from the identity token system via the secure mobile application. For example, after logging into the secure mobile application, the sponsor device may use the secure mobile application to communicate a request for the unique identifier to the identity token system.

In some non-limiting embodiments or aspects, the identity token system (e.g., transaction service provider system 102 and/or the like) may receive a request for the unique identifier from the sponsor device (e.g., first customer device 106 and/or the like). For example, the identity token system may receive the request for the unique identifier from the secure mobile application of the sponsor device.

In some non-limiting embodiments or aspects, the enrollee device (e.g., second customer device 106 and/or the like) associated with the enrolling user may include a secure mobile application, as described herein. Additionally or alternatively, the enrollee device may log into the secure mobile application via a strong authentication technique, as described herein.

In some non-limiting embodiments or aspects, the unique identifier (e.g., first unique identifier) may include an identifier associated with the sponsoring user. In some non-limiting embodiments or aspects, the first unique identifier may include a numeric identifier; an alphanumeric identifier; a combination of characters, numbers, and symbols; a uniform resource locator (URL) (e.g., #456@authority.org), an account identifier, a token, a payment token, any combination thereof, and/or the like.

As shown in FIG. 3, at step 304, process 300 may include communicating the unique identifier. For example, the identity token system (e.g., transaction service provider system 102 and/or the like) may communicate a unique identifier (e.g., a first unique identifier) to a sponsor device (e.g., first customer device 106 and/or the like) associated with a sponsoring user.

In some non-limiting embodiments or aspects, the sponsor device (e.g., first customer device 106 and/or the like) may include a secure mobile application, as described herein. Additionally or alternatively, the identity token system (e.g., transaction service provider system 102 and/or the like) may communicate the first unique identifier to the secure mobile application of the sponsor device.

As shown in FIG. 3, at step 306, process 300 may include communicating biometric data (e.g., image data) with the unique identifier. For example, the sponsor device (e.g., first customer device 106 and/or the like) may communicate first image data associated with a first image of an enrolling user, and the first image data may include the first unique identifier. Additionally or alternatively, the identity token system (e.g., transaction service provider system 102 and/or the like) may receive the first image data (e.g., including the unique identifier). In some non-limiting embodiments or aspects, in addition to or instead of first image data, the sponsor device (e.g., first customer device 106 and/or the like) may communicate first biometric data (e.g., voice data (e.g., audio files and/or the like), fingerprint data, and/or the like) associated with first biometric information of the enrolling user.

In some non-limiting embodiments or aspects, the sponsor device (e.g., first customer device 106 and/or the like) may obtain a first image of the enrolling user. For example, the sponsor device may include an image capture device (e.g., a camera and/or the like). Additionally or alternatively, the sponsor device may capture a first image of the enrolling user via the image capture device. In some non-limiting embodiments or aspects, the sponsor device may receive the first image of the enrolling user, e.g., from the enrollee device (e.g., second customer device 106 and/or the like).

In some non-limiting embodiments or aspects, the sponsor device (e.g., first customer device 106 and/or the like) may include a secure mobile application, as described herein. Additionally or alternatively, the sponsor device may use the secure mobile application to obtain (e.g., capture, receive, and/or the like) the first image of the enrolling user. In some non-limiting embodiments or aspects, the sponsor device may use the secure mobile application to communicate the first image data to the identity token system (e.g., transaction service provider system 102 and/or the like). Additionally or alternatively, the identity token system may receive the image data from the secure mobile application of the sponsor device.

In some non-limiting embodiments or aspects, the first image data may include a value (e.g., a checksum value and/or the like) associated with the first image. For example, the sponsor device (e.g., first customer device 106 and/or the like) may generate the checksum value based on the first image. In some non-limiting embodiments or aspects, the sponsor device (e.g., first customer device 106 and/or the like) may generate the checksum value based on the image using the secure mobile application.

In some non-limiting embodiments or aspects, the first image data may include the unique identifier (e.g., first unique identifier) embedded in the first image. For example, the sponsor device (e.g., first customer device 106 and/or the like) may embed the first unique identifier in the first image by inserting the first unique identifier in metadata of the first image. Additionally or alternatively, the sponsor device may embed the first unique identifier in the first image by steganography. For example, embedding the first unique identifier in the first image by steganography may include the sponsor device adjusting at least one bit of a plurality of pixel values of the first image based on the first unique identifier. In some non-limiting embodiments or aspects, the sponsor device (e.g., first customer device 106 and/or the like) may embed the first unique identifier in the checksum value image by inserting the first unique identifier in metadata of the checksum value. Additionally or alternatively, the sponsor device may embed the first unique identifier in the checksum value by steganography.

In some non-limiting embodiments or aspects, the first image data may be signed by the sponsor device (e.g., first customer device 106 and/or the like). For example, the sponsor device may sign the first image data using any suitable digital signature technique (e.g., cryptographic signature, one-way hash signature, public key infrastructure (PKI) signature, public-private key cryptography, public key encryption, Rivest-Shamir-Adleman (RSA) encryption, any combination thereof, and/or the like).

As shown in FIG. 3, at step 308, process 300 may include recording at least a portion of the image data (e.g., first image data) and/or the unique identifier (e.g., first unique identifier). For example, the registry (e.g., transaction service provider system 102, an encrypted distributed ledger (e.g., a blockchain), and/or the like) may record at least a portion of the first image data and the first unique identifier.

In some non-limiting embodiments or aspects, the registry (e.g., transaction service provider system 102, an encrypted distributed ledger (e.g., a blockchain), and/or the like) may receive the first image data (or a portion thereof) with the first unique identifier from the sponsor device (e.g., first customer device 106 and/or the like). For example, the sponsor device may communicate the first image data (or a portion thereof) with the first unique identifier to the registry (e.g., via the secure mobile application). Additionally or alternatively, the registry may receive the first image data (or a portion thereof) with the first unique identifier from the identity token system (e.g., transaction service provider system 102 and/or the like). For example, the sponsor device may communicate (e.g., via the secure mobile application) with the identity token system, which may in turn communicate with the registry.

In some non-limiting embodiments or aspects, the first image data may include the checksum value and the unique identifier (e.g., first unique identifier) but not the first image (e.g., of the enrolling user). Additionally or alternatively, the first image data may include the checksum value and include the first image having the unique identifier embedded therein, as described herein. In some non-limiting embodiments or aspects, the registry may record the checksum value linked with the unique identifier (e.g., to provide a linked pair including the checksum value and the unique identifier). In some non-limiting embodiments or aspects, the registry may permanently store the checksum value linked and the unique identifier (e.g., linked with each other).

In some non-limiting embodiments or aspects, the registry may include an encrypted distributed ledger (e.g., blockchain and/or the like). Additionally or alternatively, the registry may include multiple encrypted distributed ledgers. In some non-limiting embodiments or aspects, the encrypted distributed ledger(s) may be private, public, any combination thereof, and/or the like (e.g., depending on the use case, consumer preferences, any combination thereof, and/or the like). In some non-limiting embodiments or aspects, access to entries in the registry may be controlled by the owner of the information (e.g., access to the enrolling user's information may be controlled by the enrolling user, access to the sponsor's information may be controlled by the sponsor, any combination thereof, and/or the like). For example, the respective user (e.g., enrolling user, sponsoring user, and/or the like) may receive a notification that a relying party system is attempting to access the respective user's information, and the respective user may approve the access thereto (e.g., via the secure mobile application on the respective user's device).

As shown in FIG. 3, at step 310, process 300 may include generating at least one edge in a tree. For example, the identity token system (e.g., transaction service provider system 102 and/or the like) may generate a first edge in a tree based on the first image data (or a portion thereof), the first unique identifier, and/or the like. In some non-limiting embodiments or aspects, the tree may include a plurality of nodes and a plurality of edges. For example, each node of the plurality of nodes may be connected to at least one other node of the plurality of nodes by a respective edge of the plurality of edges. In some non-limiting embodiments or aspects, the first edge may connect a first node of the plurality of nodes associated with the sponsoring user to a second node of the plurality of nodes associated with the enrolling user.

In some non-limiting embodiments or aspects, the registry (e.g., encrypted distributed ledger and/or the like) may store the tree and/or data associated therewith (e.g., node data associated with each node, edge data associated with each edge, any combination thereof, and/or the like). For example, each node may be associated with an identifier (e.g., a first node associated with the sponsoring user may be associated with the first unique identifier, a second node associated with the enrolling user may be associated with a second unique identifier, and/or the like). Additionally or alternatively, each node may correspond to an identity (e.g., of the user associated with the node). In some non-limiting embodiments or aspects, each respective node (e.g., node data associated therewith) may additionally include sponsor data associated with sponsors of the node (e.g., a listing of unique identifiers associated with other nodes in the tree that have sponsored the respective node), sponsored party data associated with other nodes that the respective node has sponsored (e.g., a listing of unique identifiers associated with other nodes in the tree that the respective node has sponsored), trust score data associated with a trust score (e.g., current trust score and/or the like) for the respective node, and/or checksum data associated with checksum value of the images associated with each unique identifier.

As shown in FIG. 3, at step 312, process 300 may include determining a trust score. For example, the identity token system (e.g., transaction service provider system 102 and/or the like) may determine a trust score (e.g., second trust score) for the second node (e.g., associated with the enrolling user) based on a respective trust score of each of at least one node of the plurality of nodes connected to the second node by a respective edge of the plurality of edges. Additionally or alternatively, the first node (e.g., associated with the sponsoring user) may be included in the node(s) connected to the second node, and the first node may be associated with a respective trust score (e.g., a first trust score).

In some non-limiting embodiments or aspects, the identity token system (e.g., transaction service provider system 102 and/or the like) may determine the trust score for a given node (e.g., the second trust score of the second node and/or the like) based on a weighted combination of the respective trust score of each node connected to the given node by a respective edge. In some non-limiting embodiments or aspects, the trust score for a given node (e.g., the second trust score of the second node and/or the like) may be calculated as an average of the scores of each other node connected directly thereto (e.g., connected to the given node by a respective edge). Additionally or alternatively, the trust score for a given node (e.g., the second trust score of the second node and/or the like) may be calculated as a weighted average of other nodes connected directly or indirectly up to n orders (e.g., levels, hops, and/or the like) to the given node. For example, the weighting may be based on the number of orders (e.g., levels, hops, and/or the like) from the given node. For example, the weighting may be the reciprocal of the order (e.g., $1/\text{NumberOfHops}$ and/or the like), the inverse square of the order (e.g., $1/(\text{NumberOfHops}^2)$ and/or the like). Additionally or alternatively, the weighting may be based on whether the other nodes are sponsor nodes or sponsored nodes of the given node (e.g., sponsor nodes may be weighted more or less than sponsored nodes. Additionally or alternatively, the weighting of the other nodes connected to the given node may derated over time (e.g., a refresh (e.g., new sponsorship and/or the like) from the sponsor may improves the weighting thereof). Additionally or alternatively, the weighting may be based on whether the other nodes are associated with negative and/or positive events (e.g., nodes associated with negative events may have stronger (e.g., greater) weighting and/or the like). Additionally or alternatively, the weighting may be based on how recent activity (e.g., at least one event) has occurred on the other nodes (e.g., so fresh data is applied). Additionally or alternatively, the weighting may be based on the age of the other nodes (e.g., newer nodes may have weaker (e.g., lesser) weighting).

In some non-limiting embodiments or aspects, the identity token system (e.g., transaction service provider system 102 and/or the like) may identify at least one subset (e.g., a subset, a sub-network, a plurality of subsets, a plurality of sub-networks, and/or the like) of the plurality of nodes of the tree based on network analysis (e.g., cut set analysis, clustering, tree search techniques, and/or the like). For example, if trust scores associated with a subset of nodes are poor, the subset of nodes may be identified (e.g., by the identity token system). In some non-limiting embodiments or aspects, the identity token system may remove the subset of nodes from the tree based on such identification. Additionally or alternatively, the identity token system may flag (e.g., annotate, isolate, monitor, and/or the like) the subset of nodes in the tree based on such identification (e.g., because this subset of nodes may be roots of additional fraud and monitoring new sponsorships associated therewith may reveal other fraudulent activity).

In some non-limiting embodiments or aspects, the identity token system (e.g., transaction service provider system 102 and/or the like) may update the trust score of at least one node of the tree based on an event. For example, the identity token system may receive (e.g., from transaction service provider system 102, issuer system 104, merchant system 108, and/or the like) event data (e.g., positive event data, negative event data, any combination thereof, and/or the like) associated with at least one event associated with a node (e.g., a third node) of the tree. Additionally or alternatively, the identity token system may adjust (e.g., update, modify, change, recalculate, and/or the like) a trust score (e.g., a third trust score) associated with the node (e.g., third node) based on the event data. In some non-limiting embodiments or aspects, the event data may include negative event data associated with at least one negative event, and adjusting the trust score may include degrading (e.g., reducing and/or the like) the trust score. For example, the negative event data may include at least one of complaint data associated with a complaint, an indication (e.g., fraud indication and/or the like) associated with a fraudulent transaction, any combination thereof, and/or the like. Additionally or alternatively, the event data may include positive event data associated with at least one positive event, and adjusting the trust score may include upgrading (e.g., increasing and/or the like) the trust score. For example, the positive event data may include at least one of approved transaction data associated with at least one approved transaction, settled transaction data associated with at least one settled transaction, a lack of negative event data for a period of time (e.g., a selectable period of time, a preselected period of time, a predetermined period of time, a dynamic period of time, and/or the like), and/or the like. For example, if a transaction associated with a node (e.g., associated with the user represented by the node) is not reversed within a selected period (e.g., 24 hours, 48 hours, 1 week, 30 days, 90 days and/or the like), the trust score associated with that node may be upgraded, and/or the amount of such upgrading may be based on the length of the selected period (e.g., a longer period may have greater adjustment of the trust score than a shorter period). In some non-limiting embodiments or aspects, the downgrading of a trust score based on negative event data may have greater impact (e.g., greater weight, greater adjustment in value, and/or the like) than the upgrading of the trust score based on positive event data. For example, a trust score may be upgraded in relatively small increments for each positive event associated with positive event data, and/or the trust score may be downgraded in relatively large increments for each negative event associated with negative event data.

In some non-limiting embodiments or aspects, the node (e.g., third node) may be the same as the first node associated with the sponsoring user or the second node associated with the enrolling user.

In some non-limiting embodiments or aspects, the identity token system (e.g., transaction service provider system 102 and/or the like) may adjust the trust score for each node of the tree connected by one of the edges to the node (e.g., third node) associated with the event data. For example, a given node (e.g., at least one of the first node associated with the sponsoring user, the second node associated with the enrolling user, any combination thereof, and/or the like) may be connected to the third node by at least one edge, and the trust score associated with the given node (e.g., at least one of the first trust score, the second trust score, any combination thereof, and/or the like, respectively) may be adjusted based on the event data. For example, the event data may include negative event data associated with at least one negative event, and adjusting the trust score may include degrading (e.g., reducing and/or the like) the trust score of the given node. Additionally or alternatively, the event data may include positive event data associated with at least one positive event, and adjusting the trust score may include upgrading (e.g., increasing and/or the like) the trust score of the given node. In some non-limiting embodiments or aspects, the type of the event may impact how scores are adjusted (e.g., have greater weight and/or the like). For example, an account takeover may result in chargebacks, but this may be different from a completely fake identity (e.g., the former may have lesser weight than the latter or vice versa).

In some non-limiting embodiments or aspects, the identity token system (e.g., transaction service provider system 102 and/or the like) may remove at least one edge of the plurality of edges. For example, the identity token system may receive from the sponsor device (e.g., via the secure mobile application thereof) a request to remove an edge (e.g., remove a sponsorship connection) connecting the first node associated with the sponsoring user and the second node associated with the enrolling user. Additionally or alternatively, the identity token system may remove the edge (e.g., the sponsorship connection) connecting the first node associated with the sponsoring user and the second node associated with the enrolling user based on the request. In some non-limiting embodiments or aspects, removing the edge may include recording (e.g., in the registry, identity token system, and/or the like) an annotation associated with the edge indicating that the edge is no longer valid (e.g., the sponsoring user has disavowed the sponsorship and/or the like).

As shown in FIG. 3, at step 314, process 300 may include receiving a request for and/or communicating the trust score. For example, the identity token system (e.g., transaction service provider system 102 and/or the like) may receive (e.g., from the document verification system, a relying party system, and/or the like) at least one request for the trust score (e.g., second trust score) associated with the enrolling user. Additionally or alternatively, the identity token system may communicate the trust score (e.g., in response to the request and/or the like).

In some non-limiting embodiments or aspects, the document verification system (e.g., transaction service provider system 102 and/or the like) may receive second image data associated with a second image of a government identification document of the enrolling user, e.g., from the enrollee device (e.g., second customer device 106 and/or the like) and/or the sponsor device (e.g., first customer device 106 and/or the like). For example, the first image may include a first representation of a face of the enrolling user (e.g., as captured by the sponsor device and/or the like) and the second image may include a second representation of the face of the enrolling user (e.g., as depicted on the government identification and/or the like. Additionally or alternatively, the document verification system may compare the first image to the second image to determine whether the first representation matches the second representation. In some non-limiting embodiments or aspects, the document verification system may communicate a request for the trust score of the enrolling user (e.g., the second trust score) to the identity token system (e.g., transaction service provider system 102 and/or the like). Additionally or alternatively, the identity token system may communicate the trust score of the enrolling user (e.g., the second trust score) to the document verification system (e.g., in response to the request). In some non-limiting embodiments or aspects, document verification system may determine whether to approve the enrolling user and/or the government identification document thereof based on the comparison of the first image to the second image, the trust score of the enrolling user, and/or the like.

In some non-limiting embodiments or aspects, the relying party system (e.g., merchant system 108 and/or the like) may communicate a request for the trust score of the enrolling user (e.g., the second trust score) to the identity token system (e.g., transaction service provider system 102 and/or the like). Additionally or alternatively, the identity token system may receive the request for the trust score of the enrolling user (e.g., the second trust score). Additionally or alternatively, the identity token system may communicate the trust score of the enrolling user (e.g., the second trust score) to the relying party system (e.g., in response to the request).

In some non-limiting embodiments or aspects, the request for the trust score of the enrolling user (e.g., the second trust score) may include the first unique identifier. For example, the relying party system (e.g., merchant system 108 and/or the like) may receive the first image with the unique identifier embedded therein (e.g., from the enrollee device, sponsor device, and/or the like). In some non-limiting embodiments or aspects, the relying party system may extract the first unique identifier from the first image (e.g., from the metadata, by steganography, and/or the like) and may communicate the first unique identifier with the request for the trust score of the enrolling user. Additionally or alternatively, the relying party system may generate the checksum value based on the first image, and the request for the trust score of the enrolling user may include the first unique identifier (e.g., as extracted from the first image) and the checksum value (e.g., for testing against the checksum value recorded in the registry). In some non-limiting embodiments or aspects, the relying party system may communicate the first image (e.g., with the unique identifier embedded therein) with the request for the trust score of the enrolling user. In some non-limiting embodiments or aspects, the relying party system may receive the first unique identifier (e.g., from the enrollee device, sponsor device, and/or the like), e.g., with proof of registration (e.g., recordation and/or the like) of the unique identifier in the registry (e.g., transaction service provider system 102 and/or the like). For example, the proof of registration may include a copy of the entry in the registry and/or the like. In some non-limiting embodiments or aspects, the relying party system may communicate the first unique identifier with the request for the trust score of the enrolling user.

In some non-limiting embodiments or aspects, after the checksum value linked and the unique identifier are recorded in the registry (e.g., linked with each other), a relying party system (e.g., merchant system 108 and/or the like) may look up the unique identifier (e.g., associated with the sponsoring user) in the registry (e.g., without necessarily knowing the identity of the sponsoring user) to determine a trust score associated therewith. Additionally or alternatively, if the sponsoring user's identity were known to the relying party system, then the relying party could further look up the sponsors of the sponsoring user (e.g., go up a level of sponsorship and/or the like) to determine the trust scores associated therewith (e.g., and keep repeating (e.g., going up levels) until the relying party system reaches (e.g., has looked up) a suitable (e.g., selected, dynamic, and/or the like) number of levels).

In some non-limiting embodiments or aspects, the relying party system (e.g., merchant system 108 and/or the like) may create an account for the enrolling user with the relying party system based on the second trust score. For example, if the trust score satisfies (e.g., exceeds and/or the like) a threshold (e.g., a selectable threshold, a preselected threshold, a predetermined threshold, a dynamic threshold, and/or the like), the relying party system may create the account for the enrolling user.

In some non-limiting embodiments or aspects, communicating the trust score may include communicating a vector of trust scores including the trust score. For example, the identity token system (e.g., transaction service provider system 102 and/or the like) may communicate a vector of trust scores including the trust score for the requested user (e.g., enrolling user) and every node connected directly or indirectly to the node associated with the requested user. Additionally or alternatively, values of the vector may be ordered based on the distance (e.g., number of orders, level, hops, and/or the like) from the node associated with the requested user. For example, this may allow the requesting party system to develop its own application specific logic based on the vector of trust scores.

Referring now to FIGS. 4A-4H, FIGS. 4A-4H are diagrams of an exemplary implementation 400 of non-limiting embodiments or aspects relating to process 300 shown in FIG. 3. As shown in FIGS. 4A-4H, implementation 400 may include sponsor device 406a, enrollee device 406b, document verification system 402a, identity token system 402b, registry 402c, and/or relying party system 408. In some non-limiting embodiments or aspects, sponsor device 406a may be the same as or similar to a first customer device 106. In some non-limiting embodiments or aspects, enrollee device 406b may be the same as or similar to a second customer device 106. In some non-limiting embodiments or aspects, document verification system 402a may be implemented (e.g., completely, partially, and/or the like) by transaction service provider system 102. Additionally or alternatively, document verification system 402a may be implemented (e.g., completely, partially, and/or the like) by another system, another device, another group of systems, or another group of devices, separate from or including transaction service provider system 102, such as issuer system 104 (e.g., one or more devices of issuer system 104), a third party document verification system, and/or the like. In some non-limiting embodiments or aspects, identity token system 402b may be implemented (e.g., completely, partially, and/or the like) by transaction service provider system 102.

Additionally or alternatively, identity token system 402b may be implemented (e.g., completely, partially, and/or the like) by another system, another device, another group of systems, or another group of devices, separate from or including transaction service provider system 102, such as issuer system 104 (e.g., one or more devices of issuer system 104), a third party identity token system, and/or the like. In some non-limiting embodiments or aspects, registry 402c may be implemented (e.g., completely, partially, and/or the like) by transaction service provider system 102. Additionally or alternatively, registry 402c may be implemented (e.g., completely, partially, and/or the like) by another system, another device, another group of systems, or another group of devices, separate from or including transaction service provider system 102, such as issuer system 104 (e.g., one or more devices of issuer system 104), a third party registry, an encrypted distributed ledger (e.g., a blockchain and/or the like), and/or the like. In some non-limiting embodiments or aspects, relying party system 408 may be implemented (e.g., completely, partially, and/or the like) by merchant system 108. Additionally or alternatively, relying party system 408 may be implemented (e.g., completely, partially, and/or the like) by another system, another device, another group of systems, or another group of devices, separate from or including merchant system 108, such as issuer system 104 (e.g., one or more devices of issuer system 104), a third customer device 106, transaction service provider system 102, acquirer system 110, a third party system, a government system, and/or the like. In some non-limiting embodiments or aspects, document verification system 402a, identity token system 402b, registry 402c, and/or any combination thereof may be implemented as a single system. Additionally or alternatively, at least one of (e.g., each of) document verification system 402a, identity token system 402b, and/or registry 402c may be implemented as a separate system (e.g., separate from the others).

As shown in FIG. 4A, at 422, implementation 400 may include logging into a secure mobile application. For example, sponsor device 406a may log into the secure mobile application, e.g., via a strong authentication technique, as described herein.

Figure 4B:
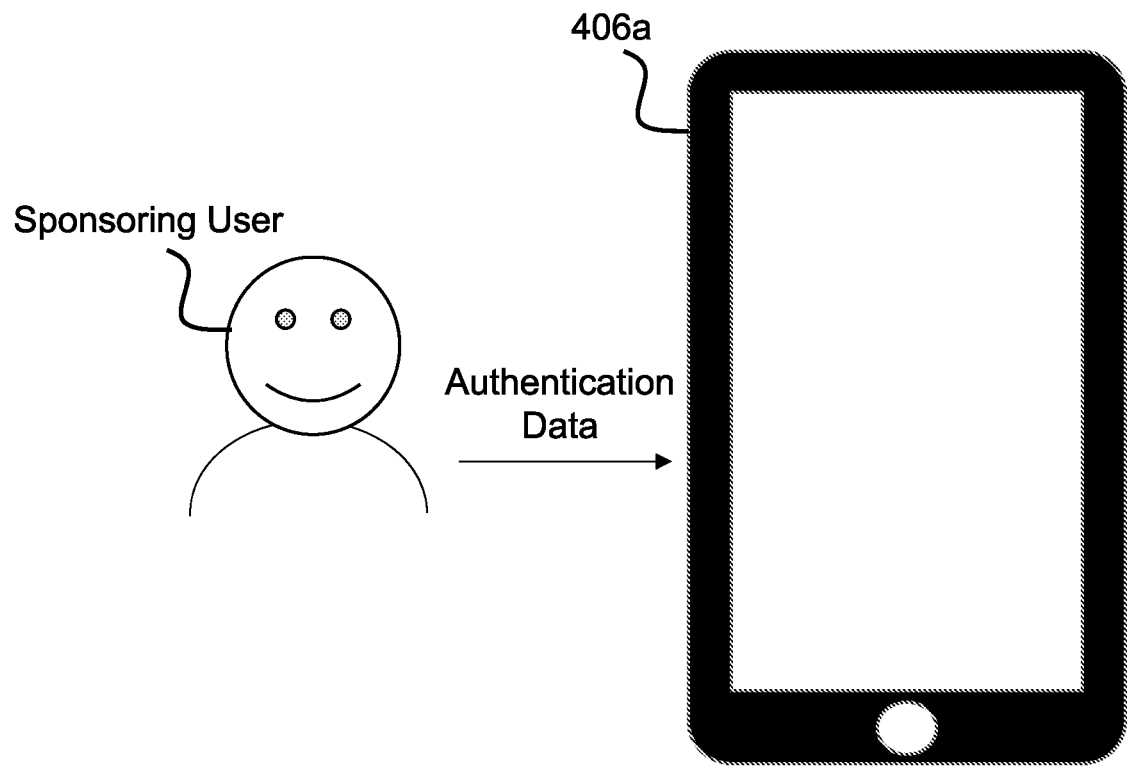

In some non-limiting embodiments or aspects, as shown in FIG. 4B, a sponsoring user sponsor device 406a may include a secure mobile application. Additionally or alternatively, sponsor device 406a may log into the secure mobile application via a strong authentication technique, as described herein. For example, a sponsoring user may provide (e.g., input and/or the like) authentication data (e.g., data required by the strong authentication technique) to sponsor device 406a, which may use the authentication data to log into the secure mobile application.

With continued reference to FIG. 4A, at 424, implementation 400 may include authenticating and/or requesting a unique identifier. For example, sponsor device 406a may authenticate with (e.g., log into and/or the like), e.g., identity token system 402b, a secure mobile application associated therewith, and/or the like, as described herein. Additionally or alternatively, sponsor device 406a may request a unique identifier (e.g., first unique identifier), e.g., from identity token system 402b, as described herein.

Figure 4C:
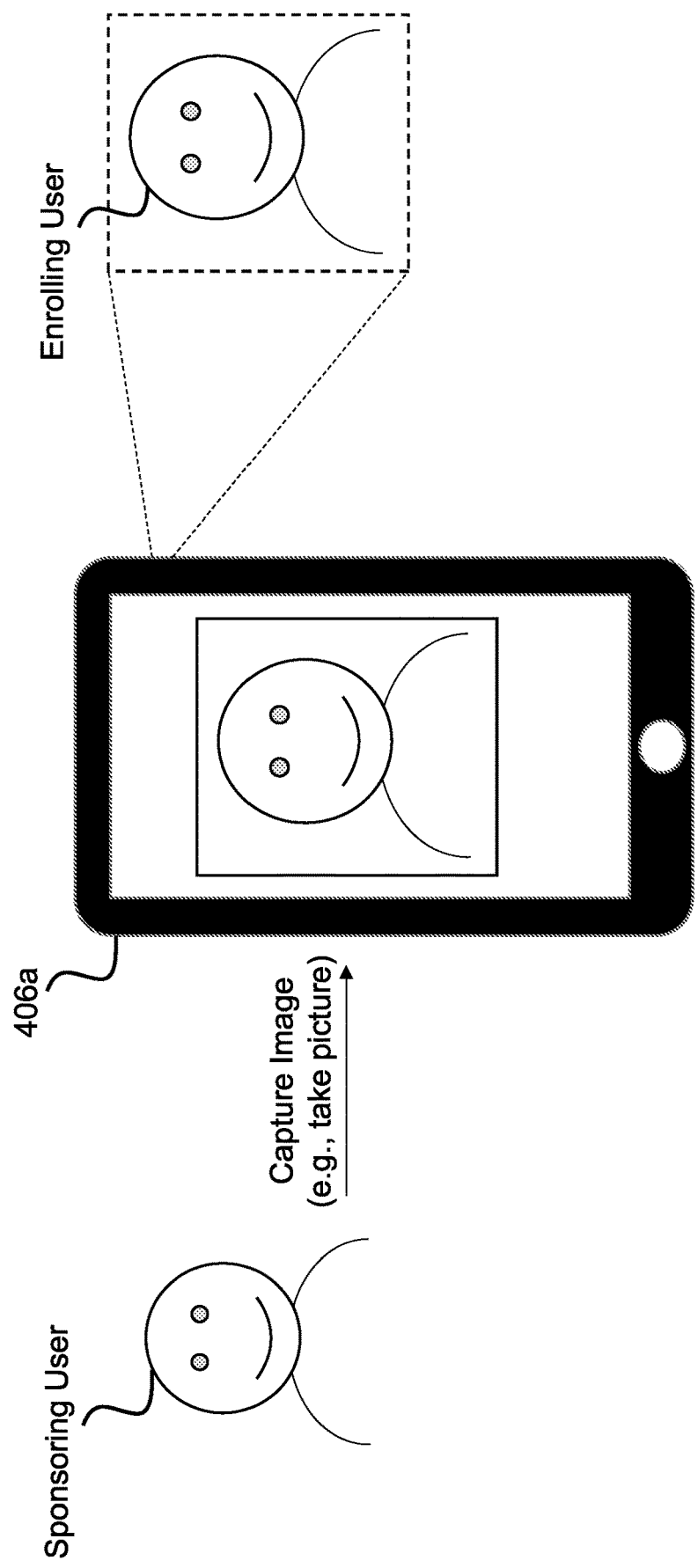
Figure 4D:
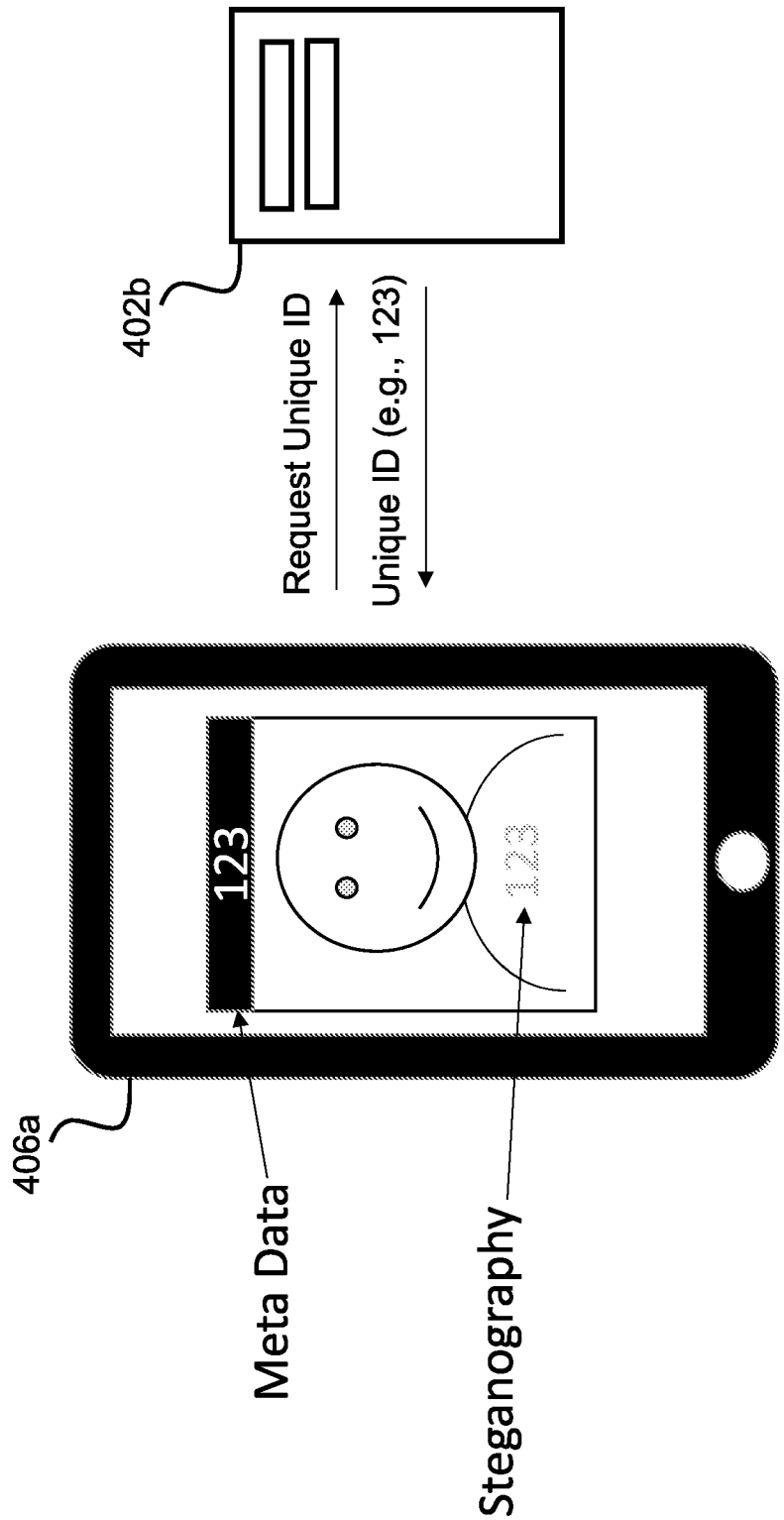

In some non-limiting embodiments or aspects, as shown in FIG. 4D, sponsor device 406a associated with a sponsoring user may request a unique identifier (e.g., first unique identifier), e.g., from identity token system 402b, as described herein. In some non-limiting embodiments or aspects, sponsor device 406a may request the unique identifier before capturing an image of the enrolling user. Additionally or alternatively, sponsor device 406a may request the unique identifier after capturing the image of the enrolling user.

With continued reference to FIG. 4A, at 426, implementation 400 may include communicating a unique identifier. For example, identity token system 402b may communicate a unique identifier (e.g., a first unique identifier) to sponsor device 406a, as described herein.

In some non-limiting embodiments or aspects, as shown in FIG. 4D, identity token system 402b may communicate a unique identifier (e.g., a first unique identifier) to sponsor device 406a, as described herein. In some non-limiting embodiments or aspects, identity token system 402b may communicate the unique identifier before capturing an image of the enrolling user. Additionally or alternatively, identity token system 402b may communicate the unique identifier after capturing the image of the enrolling user.

With continued reference to FIG. 4A, at 428, implementation 400 may include capturing an image of the enrolling user. For example, sponsor device 406a may include an image capture device (e.g., a camera and/or the like), as described herein. Additionally or alternatively, sponsor device 406a may capture a first image of the enrolling user via the image capture device (e.g., via the secure mobile application), as described herein.

In some non-limiting embodiments or aspects, as shown in FIG. 4C, sponsor device 406a may capture a first image of the enrolling user, e.g., via an image capture device (e.g., a camera and/or the like), as described herein. For example, the sponsoring user may interact with (e.g., provide input to and/or the like) the secure mobile application on sponsor device 406a to cause sponsor device 406a to capture the first image of the enrolling user.

With continued reference to FIG. 4A, at 430, implementation 400 may include embedding the unique identifier in the first image. For example, sponsor device 406a may embed the (first) unique identifier in the first image by inserting the first unique identifier in metadata of the first image and/or by steganography, as described herein.

In some non-limiting embodiments or aspects, as shown in FIG. 4D, sponsor device 406a may embed the (first) unique identifier in the first image by inserting the first unique identifier in metadata of the first image and/or by steganography, as described herein.

With continued reference to FIG. 4A, at 432, implementation 400 may include recording at least a portion of the image data (e.g., first image data) and/or the unique identifier (e.g., first unique identifier). For example, registry 402c may receive the first image data (or a portion thereof) with the first unique identifier from sponsor device 406a, as described herein. Additionally or alternatively, registry 402c may record at least a portion of the first image data and the first unique identifier. In some non-limiting embodiments or aspects, identity token system 402b may generate an edge (e.g., first edge) in a tree based on the image data (or a portion thereof) and the unique identifier (e.g., as recorded in registry 402c), as described herein.

Figure 4E:
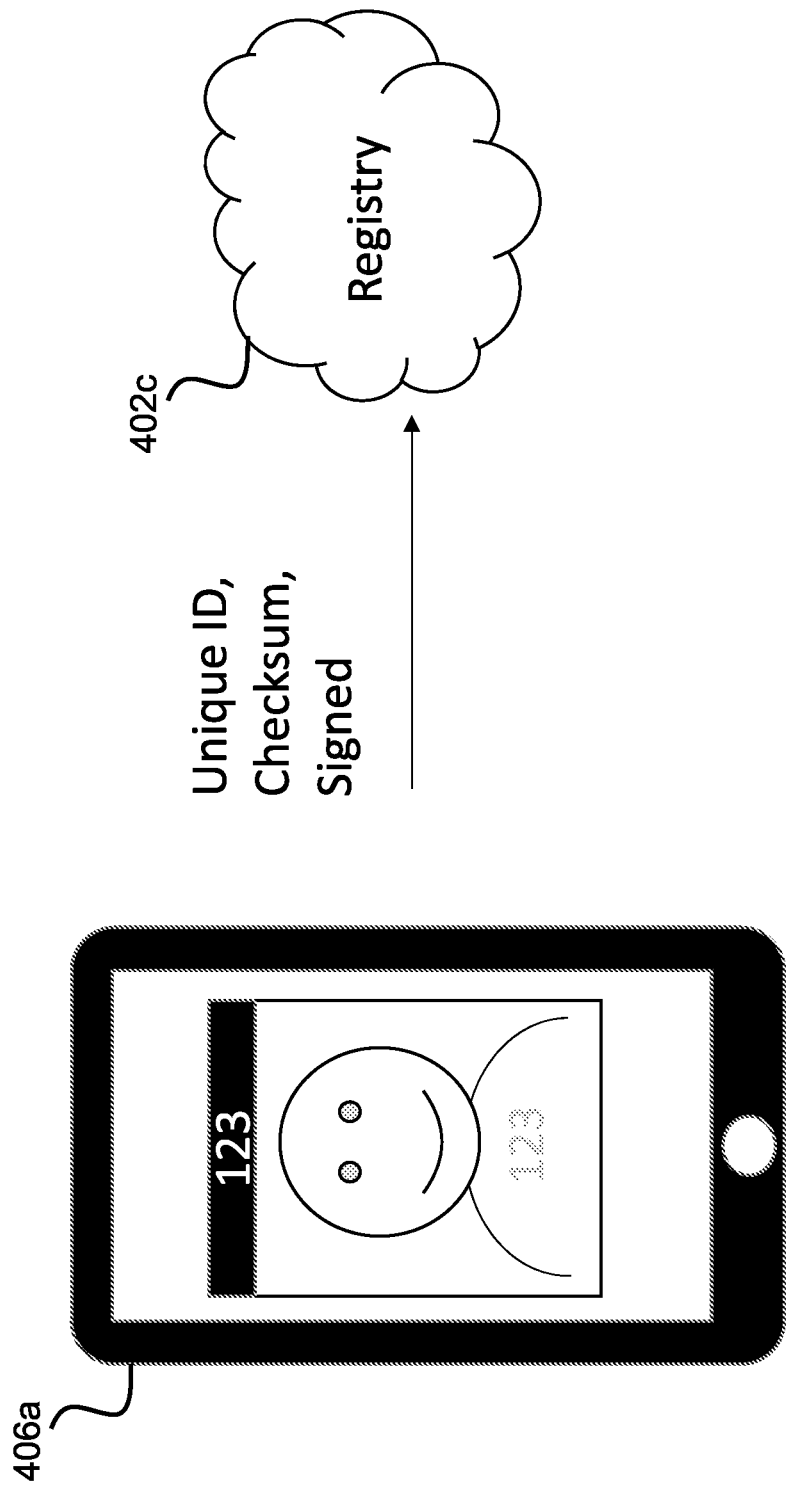

In some non-limiting embodiments or aspects, as shown in FIG. 4E, sponsor device 406a may communicate the first image data (e.g., including the first unique identifier and a checksum value generated based on the first image) to registry 402c (which may receive the first image data from sponsor device 406a), as described herein. Additionally or alternatively, the first image data may be signed by sponsor device 406a, as describe herein. Additionally or alternatively, registry 402c may record at least a portion of the first image data (e.g., the first unique identifier and the checksum value).

With continued reference to FIG. 4A, at 434, implementation 400 may include communicating second image data, e.g., associated with a second image of a government identification document of the enrolling user. For example, at least one of enrollee device 406b and/or sponsor device 406a may communicate the second image data to document verification system 402a, as described herein. Additionally or alternatively, document verification system 402a may compare the first image to the second image to determine whether a first representation of a face of the enrolling user included in the first image matches a second representation of the face of the enrolling user included in the second image, as described herein.

As shown in FIG. 4A, at 436, implementation 400 may include requesting a trust score associated with the enrolling user. For example, document verification system 402a may communicate a request for the trust score of the enrolling user to identity token system 402b, as described herein.

As shown in FIG. 4A, at 438, implementation 400 may include communicating the trust score associated with the enrolling user. For example, identity token system 402b may communicate the trust score of the enrolling user to document verification system 402a, as described herein.

As shown in FIG. 4A, at 440, implementation 400 may include approving the enrolling user and/or the government identification document thereof. For example, document verification system 402a may determine whether to approve the enrolling user and/or the government identification document thereof based on the comparison of the first image to the second image, the trust score of the enrolling user, and/or the like. In some non-limiting embodiments or aspects, document verification system 402a may communicate a message (e.g., an approval message, an indication associated with approval, and/or the like) based on approving the enrolling user and/or the government identification document thereof. Additionally or alternatively, document verification system 402a may communicate a message (e.g., a disapproval message, a rejection message, an indication associated with disapproval, and/or the like) based on not approving (e.g., rejecting) the enrolling user and/or the government identification document thereof.

As shown in FIG. 4A, at 442, implementation 400 may include requesting a trust score associated with the enrolling user. For example, relying party system 408 may communicate a request for the trust score of the enrolling user to identity token system 402b, as described herein.

In some non-limiting embodiments or aspects, as shown in FIG. 4F, sponsor device 406a may communicate image data (e.g., the first image having the first unique identifier embedded therein and/or the checksum value generated based on the first image) to enrollee device 406b (which may receive the first image data from sponsor device 406a), as described herein. Additionally or alternatively, enrollee device 406b may store the image data (e.g., the first image having the first unique identifier embedded therein and/or the checksum value generated based on the first image).

Figure 4G:
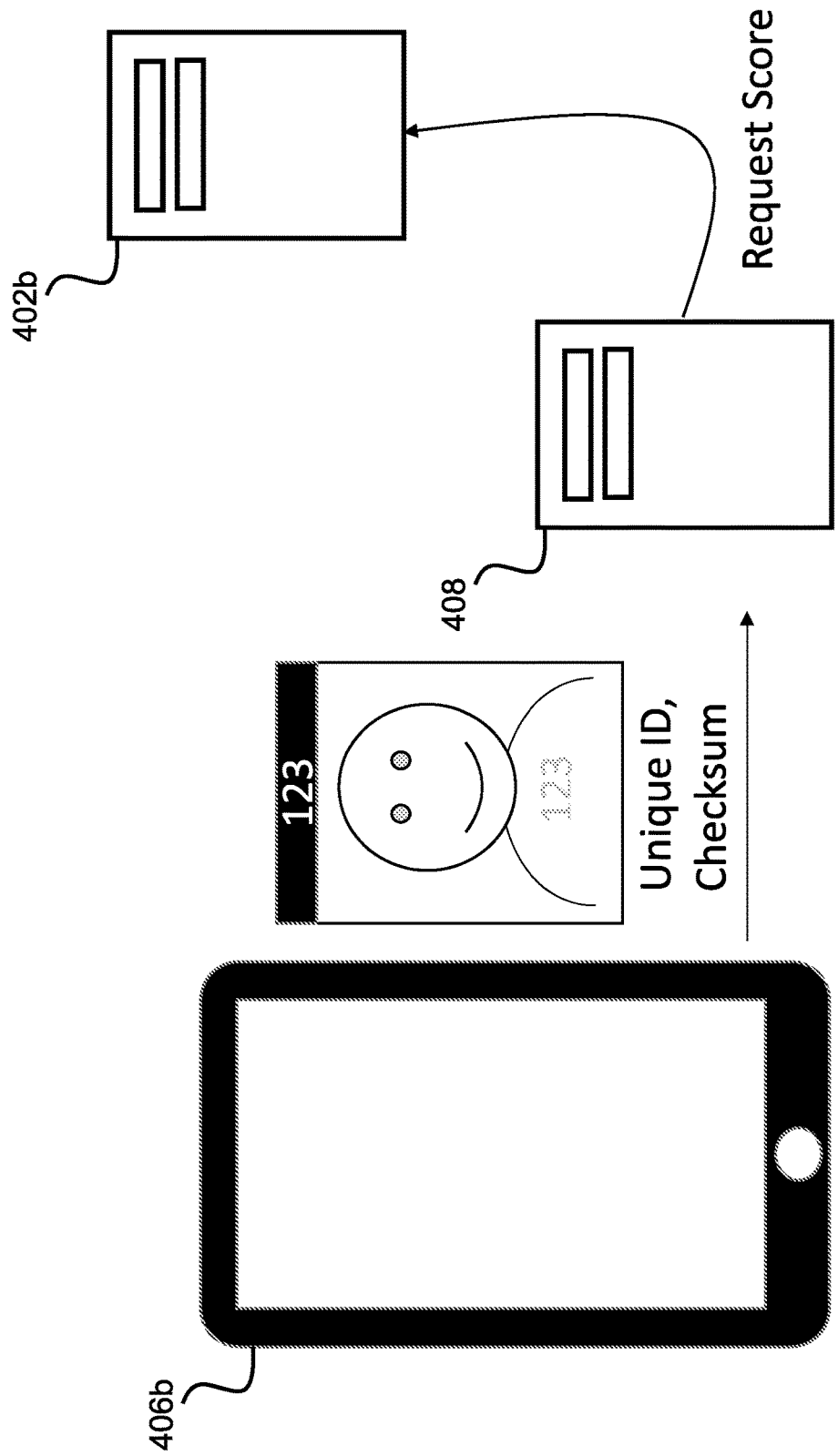
Figure 4H:
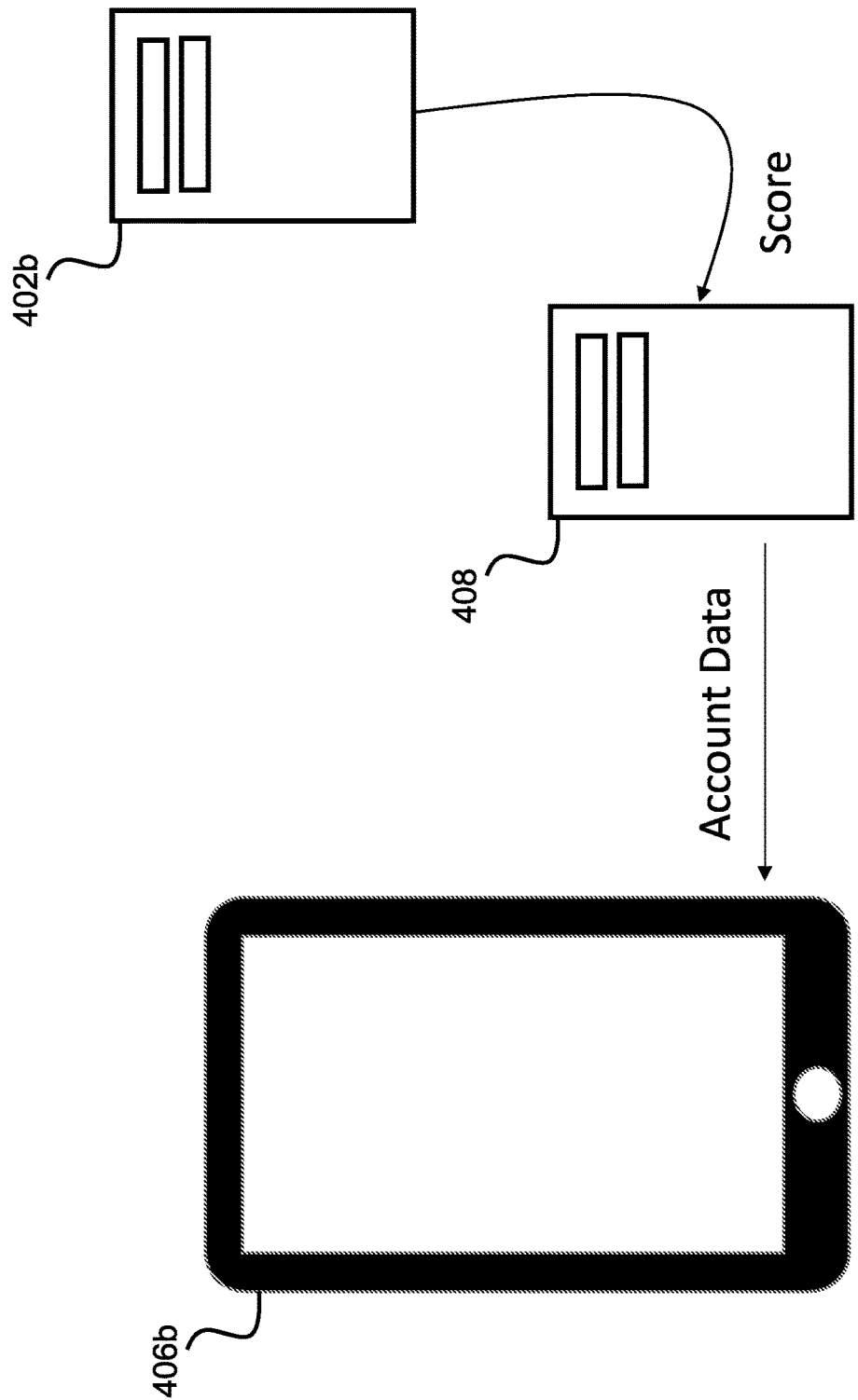

In some non-limiting embodiments or aspects, as shown in FIG. 4G, enrollee device 406b may communicate the image data (e.g., the first image having the first unique identifier embedded therein and/or the checksum value generated based on the first image) to replying party system 408 (which may receive the image data from enrollee device 406b), as described herein. Additionally or alternatively, relying party system 408 may communicate a request for the trust score of the enrolling user to identity token system 402b, as described herein.

With continued reference to FIG. 4A, at 444, implementation 400 may include communicating the trust score associated with the enrolling user. For example, identity token system 402b may communicate the trust score of the enrolling user to relying party system 408, as described herein.

In some non-limiting embodiments or aspects, as shown in FIG. 4F, identity token system 402b may communicate the trust score of the enrolling user to relying party system 408, as described herein. Additionally or alternatively, relying party system 408 may create an account for the enrolling user with relying party system 408 based on the trust score, as described herein. Additionally or alternatively, relying party system 408 may communicate account data associated with the account to enrollee device 406b.

Figure 5:
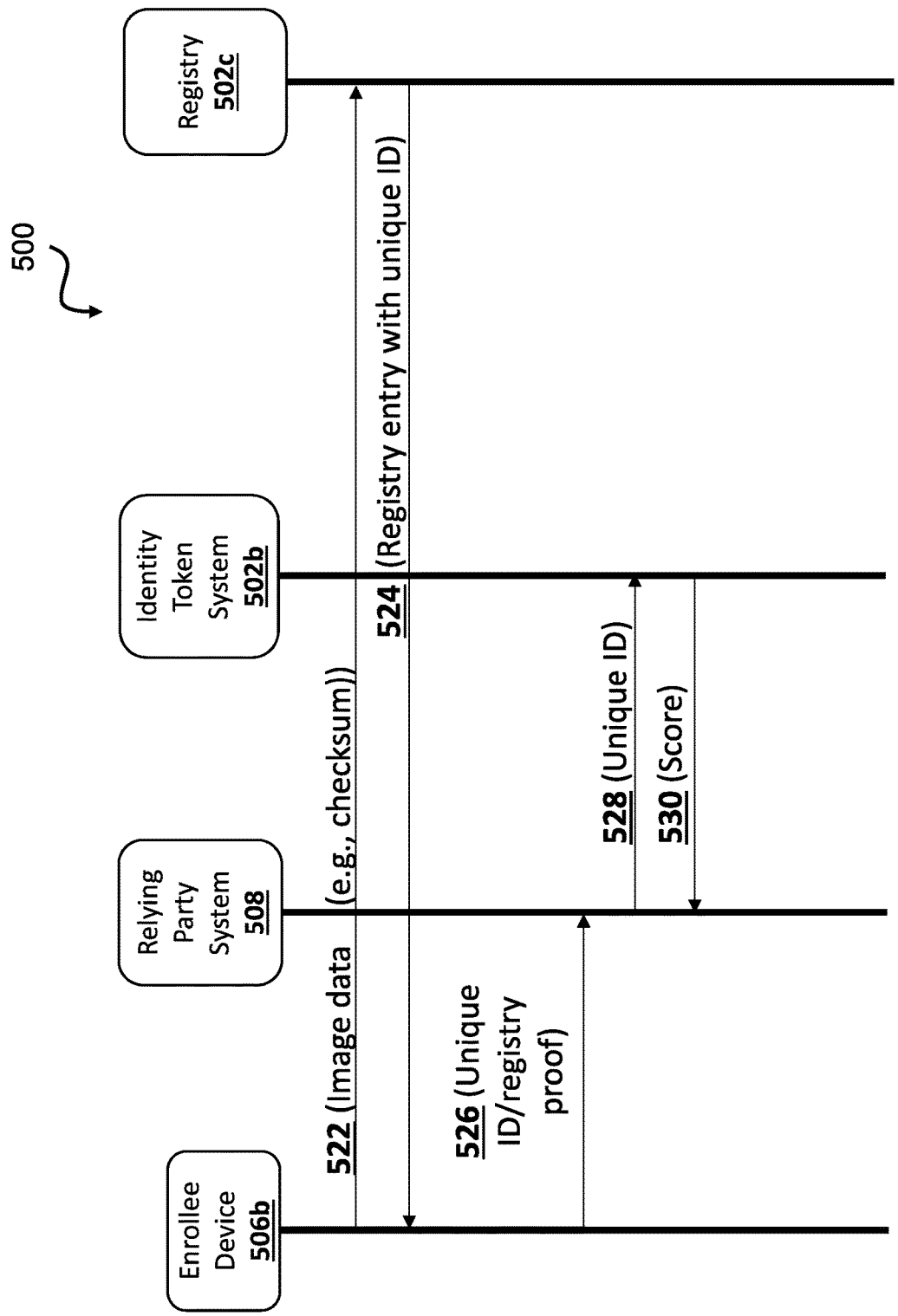
FIG. 5 is a diagram of non-limiting embodiments or aspects of an implementation of non-limiting embodiments or aspects of the process shown in FIG. 3 according to the principles of the presently disclosed subject matter.

Referring now to FIG. 5, FIG. 5 is a diagram of an exemplary implementation 500 of non-limiting embodiments or aspects relating to process 300 shown in FIG. 3. As shown in FIG. 5, implementation 500 may include enrollee device 506b, identity token system 502b, registry 502c, and/or relying party system 508. In some non-limiting embodiments or aspects, enrollee device 506b may be the same as or similar to enrollee device 406b, a second customer device 106, and/or the like. In some non-limiting embodiments or aspects, identity token system 502b may be the same as or similar to identity token system 402b, transaction service provider system 102, and/or the like. In some non-limiting embodiments or aspects, registry 502c may be the same as or similar to registry 402c, transaction service provider system 102, and/or the like. In some non-limiting embodiments or aspects, relying party system 508 may be the same as or similar to relying party system 408, merchant system 108, and/or the like. In some non-limiting embodiments or aspects, identity token system 502b and registry 502c may be implemented as a single system. Additionally or alternatively, identity token system 502b and registry 502c may be implemented as separate systems.

As shown in FIG. 5, at 522, implementation 500 may include communicating image data. For example, enrollee device 506b may communicate image data (e.g., first image data associated with the first image) to registry 502c, as described herein. In some non-limiting embodiments or aspects, the first image data may include a value (e.g., a checksum value and/or the like) associated with the first image, as described herein.

As shown in FIG. 5, at 524, implementation 500 may include communicating at least one of the unique identifier and/or a copy of the entry in registry 502c associated therewith. For example, registry 502c may communicate the unique identifier and/or a copy of the entry in registry 502c associated therewith to enrollee device 506b, as described herein.

As shown in FIG. 5, at 526, implementation 500 may include communicating at least one of the unique identifier and/or proof of registration of the unique identifier in registry 502c. For example, enrollee device 506b may communicate the unique identifier and/or proof of registration of the unique identifier to relying party system 508, as described herein. In some non-limiting embodiments or aspects, the proof of registration may include the copy of the entry in registry 502c and/or the like, as described herein.

As shown in FIG. 5, at 528, implementation 500 may include communicating the unique identifier. For example, relying party system 508 may communicate the unique identifier to identity token system 502b, as described herein.

In some non-limiting embodiments or aspects, this communication may include a request for a trust score associated with the enrolling user associated with enrollee device 506b, and the request may include the unique identifier, as described herein.

As shown in FIG. 5, at 530, implementation 500 may include communicating the trust score associated with the enrolling user. For example, identity token system 502b may communicate the trust score associated with the enrolling user to relying party system 508, as described herein.

Referring now to FIG. 6, FIG. 6 is a diagram of an exemplary implementation 600 of non-limiting embodiments or aspects relating to process 300 shown in FIG. 3. As shown in FIG. 6, implementation 600 may include enrollee device 606b, identity token system 602b, registry 602c, and/or relying party system 608. In some non-limiting embodiments or aspects, enrollee device 606b may be the same as or similar to enrollee device 406b, enrollee device 506b, a second customer device 106, and/or the like. In some non-limiting embodiments or aspects, identity token system 602b may be the same as or similar to identity token system 402b, identity token system 502b, transaction service provider system 102, and/or the like. In some non-limiting embodiments or aspects, registry 602c may be the same as or similar to registry 402c, registry 502c, transaction service provider system 102, and/or the like. In some non-limiting embodiments or aspects, relying party system 608 may be the same as or similar to relying party system 408, relying party system 508, merchant system 108, and/or the like. In some non-limiting embodiments or aspects, identity token system 602b and registry 602c may be implemented as a single system. Additionally or alternatively, identity token system 602b and registry 602c may be implemented as separate systems.

As shown in FIG. 6, at 622, implementation 600 may include performing a transaction. For example, enrollee device 606b may initiate a transaction with relying party system 608, as described herein.

As shown in FIG. 6, at 624, implementation 600 may include waiting for a period of time (e.g., a selectable period of time, a preselected period of time, a predetermined period of time, a dynamic period of time, and/or the like). For example, relying party system 608 may wait for a period of time associated with a time it takes for a transaction to settle, as described herein.

As shown in FIG. 6, at 626, implementation 600 may include communicating event data associated with an event. For example, relying party system 608 may communicate the event data to identity token system 602b, as described herein. In some non-limiting embodiments or aspects, the event data may include positive event data associated with at least one positive event, as described herein. For example, the positive event data may include at least one of approved transaction data associated with at least one approved transaction, settled transaction data associated with at least one settled transaction, a lack of negative event data for the period of time (e.g., time it takes for a transaction to settle), and/or the like, as described herein.

As shown in FIG. 6, at 628, implementation 600 may include adjusting at least one trust score based on the event data. For example, identity token system 602b may adjust the trust score associated with the enrolling user associated with enrollee device 606b by upgrading (e.g., increasing and/or the like) the trust score, as described herein.

Referring now to FIG. 7, FIG. 7 is a diagram of an exemplary implementation 700 of non-limiting embodiments or aspects relating to process 300 shown in FIG. 3. As shown in FIG. 7, implementation 700 may include enrollee device 706b, identity token system 702b, registry 702c, and/or relying party system 708. In some non-limiting embodiments or aspects, enrollee device 706b may be the same as or similar to enrollee device 406b, enrollee device 506b, enrollee device 606b, a second customer device 106, and/or the like. In some non-limiting embodiments or aspects, identity token system 702b may be the same as or similar to identity token system 402b, identity token system 502b, identity token system 602b, transaction service provider system 102, and/or the like. In some non-limiting embodiments or aspects, registry 702c may be the same as or similar to registry 402c, registry 502c, registry 602c, transaction service provider system 102, and/or the like. In some non-limiting embodiments or aspects, relying party system 708 may be the same as or similar to relying party system 408, relying party system 508, relying party system 608, merchant system 108, and/or the like. In some non-limiting embodiments or aspects, identity token system 702b and registry 702c may be implemented as a single system. Additionally or alternatively, identity token system 702b and registry 702c may be implemented as separate systems.

As shown in FIG. 7, at 722, implementation 700 may include performing a transaction. For example, enrollee device 706b may initiate a transaction with relying party system 708, as described herein.

As shown in FIG. 7, at 724, implementation 700 may include waiting for a period of time (e.g., a selectable period of time, a preselected period of time, a predetermined period of time, a dynamic period of time, and/or the like). For example, relying party system 708 may wait for a period of time associated with a time it takes for a transaction to settle, as described herein.

As shown in FIG. 7, at 726, implementation 700 may include communicating event data associated with an event. For example, relying party system 708 may communicate the event data to identity token system 702b, as described herein. In some non-limiting embodiments or aspects, the event data may include negative event data associated with at least one negative event, as described herein. For example, the negative event data may include at least one of complaint data associated with a complaint, an indication (e.g., fraud indication and/or the like) associated with a fraudulent transaction, any combination thereof, and/or the like, as described herein.

As shown in FIG. 7, at 728, implementation 700 may include adjusting at least one trust score based on the event data. For example, identity token system 702b may adjust the trust score associated with the enrolling user associated with enrollee device 706b by degrading (e.g., reducing and/or the like) the trust score, as described herein.

Referring now to FIGS. 8A-8D, FIGS. 8A-8D are diagrams of an exemplary implementation of a tree 800 according to non-limiting embodiments or aspects relating to process 300 shown in FIG. 3. As shown in FIGS. 8A-8D, tree 800 may include first node 806a, second node 806b, third node 806c, fourth node 806d, fifth node 806e, sixth node 806f, seventh node 806g, eighth node 806h, ninth node 806i, and/or tenth node 806j. In some non-limiting embodiments or aspects, tree 800 may be implemented (e.g., generated and/or the like) by an identity token system (e.g., identity token system 402b, identity token system 502b, identity token system 602b, identity token system 702b, transaction service provider system 102, and/or the like).

In some non-limiting embodiments or aspects, each respective node of tree 800 may be associated with a respective user, as described herein. Additionally or alternatively, each node of tree 800 may have a trust score associated therewith, as described herein.

Figure 8A:
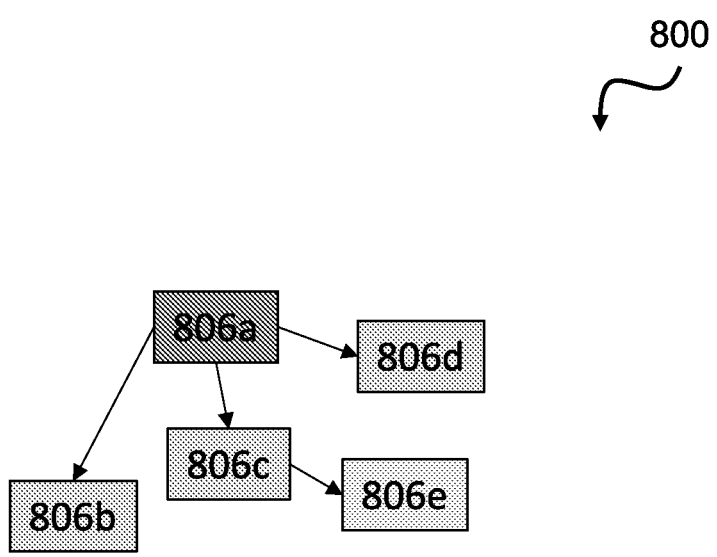
FIGS. 8A-8D are diagrams of non-limiting embodiments or aspects of an implementation of non-limiting embodiments or aspects of the process shown in FIG. 3 according to the principles of the presently disclosed subject matter.

As shown in FIG. 8A, tree 800 may initially include first node 806a, second node 806b, third node 806c, fourth node 806d, and fifth node 806e. For the purpose of illustration, a shading of each node may represent the trust score associated therewith. For example, darker shading may indicate more trustworthy (e.g., a higher trust score and/or the like). Additionally or alternatively, lighter shading may indicate less trustworthy (e.g., a lower trust score and/or the like).

In some non-limiting embodiments or aspects, first node 806a may have a first trust score associated therewith. Additionally or alternatively, first node 806a may be a root node. In some non-limiting embodiments or aspects, second node 806b, third node 806c, fourth node 806d, and fifth node 806e may have a second trust score, a third trust score, a fourth trust score, and a fifth trust score, respectively associated therewith. In some non-limiting embodiments or aspects, a trust score of each respective node may be determined based on the number of edges connecting the respective node to other nodes, the trust scores of the other nodes connected to the respective node, any combination thereof (e.g., a weighted combination and/or the like), and/or the like, as described herein. In some non-limiting embodiments or aspects, the first trust score associated with first node 806a may be the highest trust score (e.g., greater than the second, third, fourth, and fifth trust scores). Additionally or alternatively, the fifth trust score associated with fifth node 806e may be the lowest trust score (e.g., less than the first, second, third, and fourth trust scores).

Figure 8B:
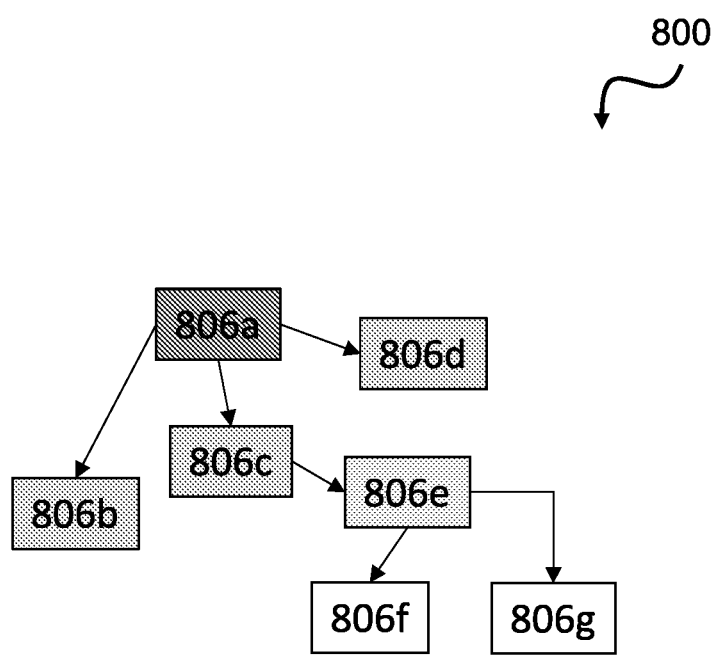

As shown in FIG. 8B, additional edges may be generated in tree 800 connecting fifth node 806e to sixth node 806f and seventh node 806g (e.g., based on newly enrolling users being sponsored by the user associated with fifth node 806e), as described herein. In some non-limiting embodiments or aspects, a sixth trust score associated with sixth node 806f and a seventh trust score associated with seventh node 806g may be determined, as described herein. For example, each of the sixth trust score and seventh trust score associated with sixth node 806f and seventh node 806g may be lower than the fifth trust score associated with fifth node 806e.

Figure 8C:
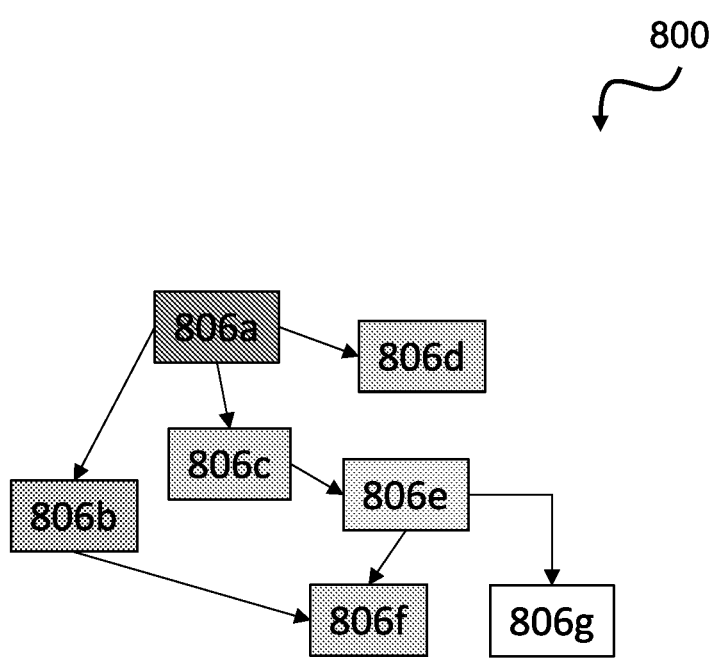

As shown in FIG. 8C, an additional edge may be generated connecting second node 806b to sixth node 806f (e.g., based on the user associated with second node 806b sponsoring the user associated with sixth node 806f), as described herein. In some non-limiting embodiments or aspects, the sixth trust score associated with sixth node 806f (and/or the second trust score associated with second node 806b) may be determined (e.g., adjusted and/or the like), as described herein. For example, the sixth trust score (and/or the second trust score) may be upgraded (e.g., increased) based on the new edge connecting sixth node 806f to second node 806b, as described herein. In some non-limiting embodiments or aspects, the sixth trust score associated with node 806f may now exceed the fifth trust score associated with fifth node 806e.

Figure 8D:
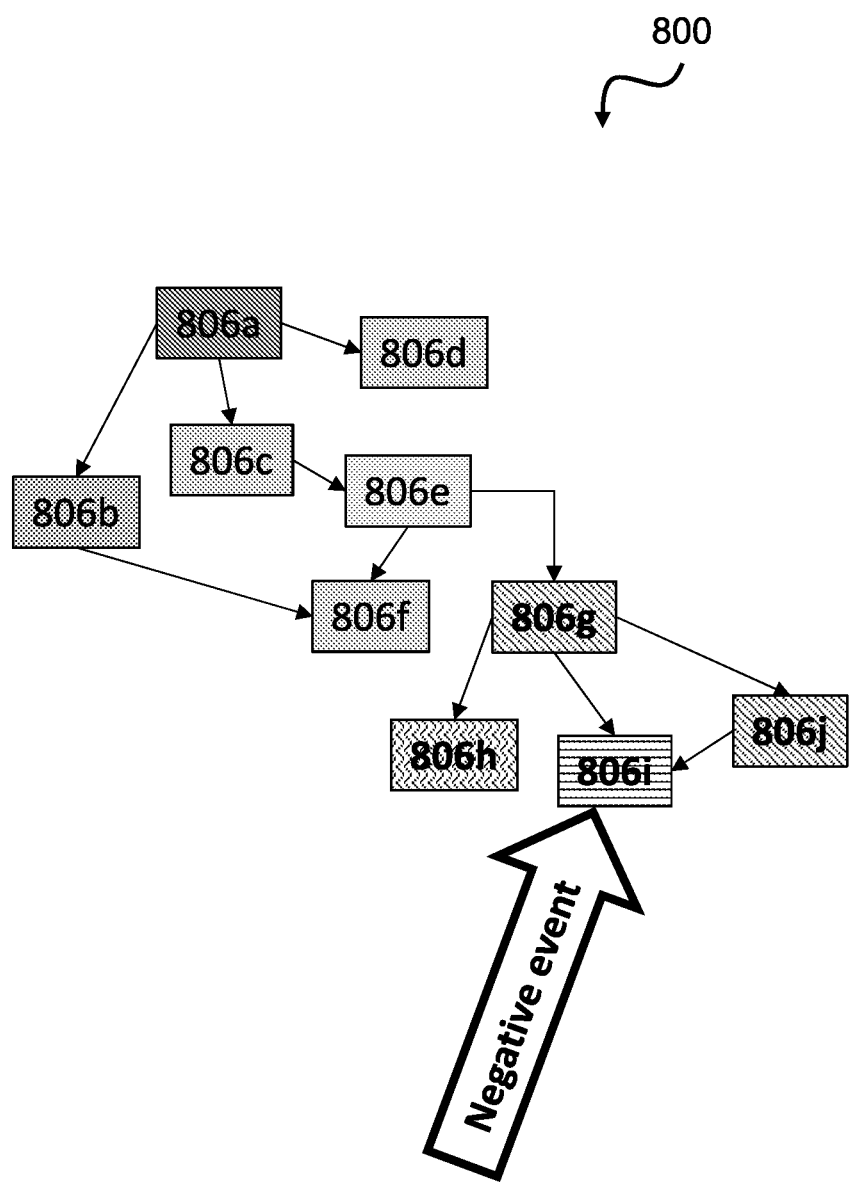

As shown in FIG. 8D, additional edges may be generated in tree 800 connecting seventh node 806g to eighth node 806h, ninth node 806i, and tenth node 806j (e.g., based on newly enrolling users being sponsored by the user associated with seventh node 806g), as described herein. Additionally or alternatively, an additional edge may be generated connecting tenth node 806j to ninth node 806i (e.g., based on the user associated with tenth node 806j sponsoring the user associated with ninth node 806i), as described herein. In some non-limiting embodiments or aspects, an eighth trust score associated with eighth node 806h, a ninth trust score associated with ninth node 806i, and a tenth trust score associated with tenth node 806j may be determined, as described herein. For example, each of the eighth trust score, ninth trust score, and tenth trust score may be lower than the seventh trust score.

In some non-limiting embodiments or aspects, event data associated with one of the nodes may be received, as described herein. For example, negative event data associated with ninth node 806i may be received, as described herein. In some non-limiting embodiments the trust score associated with ninth node 806i may be adjusted (e.g., degraded and/or the like) based on the event data. Additionally or alternatively, the trust score associated with each node (e.g., seventh node 806g, tenth node 808j, and/or the like) connected by one of the edges to ninth node 806i may be adjusted (e.g., degraded and/or the like) based on the event data. In some non-limiting embodiments or aspects, the trust score associated with at least some nodes (e.g., eighth node 806h, fifth node 806e, and/or the like) indirectly connected to ninth node 806i may be adjusted (e.g., degraded and/or the like) based on the event data. For example, the trust score associated with eighth node 806h, which is connected to (e.g., sponsored by) seventh node 806g by an edge, may also be adjusted based on the adjustment of the trust score of seventh node 806g. Additionally or alternatively, the trust score associated with fifth node 806e, which is connected to (e.g., has sponsored) seventh node 806g by an edge, may also be adjusted based on the adjustment of the trust score of seventh node 806g. In some non-limiting embodiments or aspects, the number of indirect connections (e.g., hops and/or the like) away from the node associated with the event data (e.g., ninth node 806i and/or the like) for which trust scores will be adjusted may be configurable (e.g., selectable, preselected, predetermined, dynamic, and/or the like). Additionally or alternatively, a weight factor for the adjustment of the respective trust score of a respective node may be configurable (e.g., selectable, preselected, predetermined, dynamic, and/or the like) based on the number of indirect connections (e.g., hops and/or the like) away from the node associated with the event data (e.g., ninth node 806i and/or the like).

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method, comprising:
   communicating, with at least one processor, a first unique identifier to a sponsor device associated with a sponsoring user;
   receiving, with at least one processor, first image data associated with a first image of an enrolling user from the sponsor device, the first image data comprising the first unique identifier;
   recording, with at least one processor, the first image data and the first unique identifier in a ledger;
   generating, with at least one processor, a first edge in a tree based on the first image data comprising the first unique identifier, the tree comprising a plurality of nodes and a plurality of edges, each node of the plurality of nodes connected to at least one other node of the plurality of nodes by a respective edge of the plurality of edges, the first edge connecting a first node of the plurality of nodes associated with the sponsoring user to a second node of the plurality of nodes associated with the enrolling user; and determining, with at least one processor, a trust score for the second node based on a respective trust score of each of at least one node of the plurality of nodes connected to the second node by a respective edge of the plurality of edges, the at least one node of the plurality of nodes comprising the first node, the first node associated with a first trust score.

2. The method of claim 1, wherein the sponsor device comprises a secure mobile application, wherein communicating comprises communicating the first unique identifier to the secure mobile application of the sponsor device, and wherein receiving comprises receiving the first image data from the secure mobile application of the sponsor device.

3. The method of claim 2, wherein the sponsor device logs into the secure mobile application via a strong authentication technique.

4. The method of claim 3, wherein the strong authentication technique comprises at least one of two-factor authentication (2FA), Fast IDentity Online (FIDO), or any combination thereof.

5. The method of claim 1, further comprising:
receiving, with at least one processor, a request for the first unique identifier from the sponsor device before communicating the first unique identifier.

6. The method of claim 1, wherein the first image data comprises a checksum value associated with the first image.

7. The method of claim 1, wherein the first image data comprises the first unique identifier embedded in the first image.

8. The method of claim 7, further comprising:
embedding, by the sponsor device, the first unique identifier in the first image by inserting the first unique identifier in metadata of the first image.

9. The method of claim 7, further comprising:
embedding, by the sponsor device, the first unique identifier in the first image by steganography.

10. The method of claim 9, wherein embedding the first unique identifier in the first image by steganography comprises adjusting at least one bit of a plurality of pixel values of the first image based on the first unique identifier.

11. The method of claim 1, further comprising:
receiving, with at least one processor, second image data associated with a second image of a government identification document of the enrolling user.

12. The method of claim 11, wherein the first image comprises a first representation of a face of the enrolling user and the second image comprises a second representation of the face of the enrolling user, the method further comprising:
comparing, with at least one processor, the first image to the second image to determine the first representation matches the second representation.

13. The method of claim 1, further comprising:
receiving, with at least one processor, a request for the trust score associated with the enrolling user from a relying party system.

14. The method of claim 13, wherein the request comprises the first unique identifier.

15. The method of claim 13, wherein the relying party system creates an account for the enrolling user with the relying party system based on the trust score.

16. The method of claim 1, wherein the ledger comprises an encrypted distributed ledger.

17. The method of claim 1, further comprising:
identifying, with at least one processor, at least one subset of the plurality of nodes of the tree based on network analysis.

18. The method of claim 1, further comprising:
receiving, with at least one processor, negative event data associated with at least one negative event associated with a third node of the tree;
adjusting, with at least one processor, a third trust score associated with the third node based on the negative event data; and
adjusting, with at least one processor, the trust score for each node of the plurality of nodes connected to the third node by one of the plurality of edges,
wherein the negative event data comprises at least one of complaint data associated with a complaint, an indication associated with a fraudulent transaction, or any combination thereof.

19. A system, comprising:
at least one processor; and
at least one non-transitory computer-readable medium comprising instructions to direct the at least one processor to:
communicate a first unique identifier to a sponsor device associated with a sponsoring user;
receive first image data associated with a first image of an enrolling user from the sponsor device, the first image data comprising the first unique identifier;
record the first image data and the first unique identifier in a ledger;
generate a first edge in a tree based on the first image data comprising the first unique identifier, the tree comprising a plurality of nodes and a plurality of edges, each node of the plurality of nodes connected to at least one other node of the plurality of nodes by a respective edge of the plurality of edges, the first edge connecting a first node of the plurality of nodes associated with the sponsoring user to a second node of the plurality of nodes associated with the enrolling user; and
determine a trust score for the second node based on a respective trust score of each of at least one node of the plurality of nodes connected to the second node by a respective edge of the plurality of edges, the at least one node of the plurality of nodes comprising the first node, the first node associated with a first trust score.

20. A computer program product, the computer program product comprising at least one non-transitory computer-readable medium including one or more instructions that, when executed by at least one processor, cause the at least one processor to:
communicate a first unique identifier to a sponsor device associated with a sponsoring user;
receive first image data associated with a first image of an enrolling user from the sponsor device, the first image data comprising the first unique identifier;
record the first image data and the first unique identifier in a ledger;
generate a first edge in a tree based on the first image data comprising the first unique identifier, the tree comprising a plurality of nodes and a plurality of edges, each node of the plurality of nodes connected to at least one other node of the plurality of nodes by a respective edge of the plurality of edges, the first edge connecting a first node of the plurality of nodes associated with the sponsoring user to a second node of the plurality of nodes associated with the enrolling user; and determine a trust score for the second node based on a respective trust score of each of at least one node of the plurality of nodes connected to the second node by a respective edge of the plurality of edges, the at least one node of the plurality of nodes comprising the first node, the first node associated with a first trust score.

* * * * *